US008355185B2

(12) United States Patent
Sowa et al.

(10) Patent No.: US 8,355,185 B2
(45) Date of Patent: Jan. 15, 2013

(54) EXPOSURE HEAD AND IMAGE FORMING APPARATUS

(75) Inventors: Takeshi Sowa, Nagano (JP); Ken Ikuma, Nagano (JP); Ryuta Koizumi, Nagano (JP); Nozomu Inoue, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 12/893,364

(22) Filed: Sep. 29, 2010

(65) Prior Publication Data

US 2011/0128594 A1 Jun. 2, 2011

(30) Foreign Application Priority Data

Nov. 27, 2009 (JP) ................................ 2009-269833

(51) Int. Cl.
*H04N 1/04* (2006.01)

(52) U.S. Cl. ......... 358/475; 358/474; 358/482; 358/483

(58) Field of Classification Search .................. 358/475, 358/474, 482, 483, 494
See application file for complete search history.

(56) References Cited

U.S. PATENT DOCUMENTS

| | | | | |
|---|---|---|---|---|
| 8,194,112 | B2 * | 6/2012 | Sowa et al. | 347/238 |
| 2008/0225399 | A1 * | 9/2008 | Tsujino et al. | 359/619 |
| 2009/0086328 | A1 | 4/2009 | Sowa et al. | |

FOREIGN PATENT DOCUMENTS

| | | | |
|---|---|---|---|
| JP | 2009-098613 | A | 5/2009 |

* cited by examiner

*Primary Examiner* — Houshang Safaipour
(74) *Attorney, Agent, or Firm* — Global IP Counselors, LLP

(57) ABSTRACT

Disclosed is an exposure head including a light emitting element array including light emitting elements disposed in a first direction, a light blocking member including an aperture stop through which lights emitted from the light emitting elements pass, and an image forming optical system that makes an image by using the lights having passed through the light blocking member. An absolute value of a magnification in the first direction of the image forming optical system is equal to or more than 0.7 times and is equal to or less than 0.8 times.

8 Claims, 27 Drawing Sheets

$|\beta| = 0.60$ $|\beta| = 0.65$ $|\beta| = 0.75$ $|\beta| = 0.85$ $|\beta| = 0.95$ $|\beta| = 1.00$

FIG. 16

$|\beta| = 0.7$ TIMES

| SURFACE NUMBER | DESCRIPTION | CENTRAL CURVATURE OF MAIN SECTION | SURFACE INTERVAL | MATERIAL / REFRACTIVE INDEX ABBE'S NUMBER |
|---|---|---|---|---|
| S1 | LIGHT SOURCE SURFACE | r1 = ∞ | d1 = 0.5 | Nd = 1.51680 νd = 64.17 |
| S2 | GLASS BASE MATERIAL INJECTION SURFACE | r2 = ∞ | d2 = 2.116 | |
| S3 | APERTURE STOP | r3 = ∞ | d3 = 0.31 | |
| S4 | INCIDENT SURFACE OF LENS RESIN SECTION | r4 = (SURFACE SHAPE IS SEPARATELY WRITTEN) | d4 = 0.335 | Nd = 1.57 νd = 33.0 |
| S5 | BOUNDARY SURFACE OF RESIN—GLASS | r5 = ∞ | d5 = 0.5 | Nd = 1.51680 νd = 64.17 |
| S6 | LENS INJECTION SURFACE | r6 = ∞ | d6 = 1.203 | |
| S7 | INCIDENT SURFACE OF LENS RESIN SECTION | r7 = (SURFACE SHAPE IS SEPARATELY WRITTEN) | d7 = 0.33 | Nd = 1.57 νd = 33.0 |
| S8 | BOUNDARY SURFACE OF RESIN—GLASS | r8 = ∞ | d8 = 1 | Nd = 1.51680 νd = 64.17 |
| S9 | LENS INJECTION SURFACE | r9 = ∞ | d9 = 0.799 | |
| S10 | IMAGE SURFACE | r10 = ∞ | | |

FIG. 17

$|\beta| = 0.7$ TIMES

S4 LENS SURFACE SHAPE

DEFINITION EXPRESSION (XY POLYNOMIAL EXPRESSION SURFACE)

$r^2 = x^2 + y^2$ AND $$\frac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$$

x: COORDINATE IN MAIN DIRECTION, y: COORDINATE IN SUB-DIRECTION
c: CURVATURE ON OPTICAL AXIS, K: CONIC CONSTANT, A TO I: ASPHERIC SURFACE COEFFICIENT

VALUES OF EACH COEFFICIENT
c=1/1.2464829, K=−0.6920066,
A=0.0, B=0.014611762,
C=−0.02764318, D=−0.04875889, E=−0.027552670,
F=−0.008925725, G=−0.036357407, H=−0.007400677, I=−0.0090923397

LENS DIAMETER IN MAIN DIRECTION 1.706 mm
LENS DIAMETER IN SUB-DIRECTION 1.674 mm

FIG. 18

$|\beta| = 0.7$ TIMES

S7 LENS SURFACE SHAPE

DEFINITION EXPRESSION (XY POLYNOMIAL EXPRESSION SURFACE)

$r^2 = x^2 + y^2$ AND $$\frac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$$

x: COORDINATE IN MAIN DIRECTION, y: COORDINATE IN SUB-DIRECTION
c: CURVATURE ON OPTICAL AXIS, K: CONIC CONSTANT, A TO I: ASPHERIC SURFACE COEFFICIENT

VALUES OF EACH COEFFICIENT
c=1/1.13950597, K=−1.0,
A=0.0, B=−0.023615058,
C=−0.02380489, D=−0.08221845, E=−0.06561034,
F=−0.05193780, G=−0.19324569, H=−0.22538852, I=0.022892009

LENS DIAMETER IN MAIN DIRECTION 1.683 mm
LENS DIAMETER IN SUB-DIRECTION 1.719 mm

FIG. 21

$|\beta| = 0.8$ TIMES

| SURFACE NUMBER | DESCRIPTION | CENTRAL CURVATURE OF MAIN SECTION | SURFACE INTERVAL | MATERIAL / REFRACTIVE INDEX ABBE'S NUMBER |
|---|---|---|---|---|
| S1 | LIGHT SOURCE SURFACE | r1 = ∞ | d1 = 0.5 | Nd = 1.51680 νd = 64.17 |
| S2 | GLASS BASE MATERIAL INJECTION SURFACE | r2 = ∞ | d2 = 1.751 | |
| S3 | APERTURE STOP | r3 = ∞ | d3 = 0.326 | |
| S4 | INCIDENT SURFACE OF LENS RESIN SECTION | r4 = (SURFACE SHAPE IS SEPARATELY WRITTEN) | d4 = 0.335 | Nd = 1.57 νd = 33.0 |
| S5 | BOUNDARY SURFACE OF RESIN—GLASS | r5 = ∞ | d5 = 0.5 | Nd = 1.51680 νd = 64.17 |
| S6 | LENS INJECTION SURFACE | r6 = ∞ | d6 = 1.107 | |
| S7 | INCIDENT SURFACE OF LENS RESIN SECTION | r7 = (SURFACE SHAPE IS SEPARATELY WRITTEN) | d7 = 0.35 | Nd = 1.57 νd = 33.0 |
| S8 | BOUNDARY SURFACE OF RESIN—GLASS | r8 = ∞ | d8 = 1 | Nd = 1.51680 νd = 64.17 |
| S9 | LENS INJECTION SURFACE | r9 = ∞ | d9 = 0.814 | |
| S10 | IMAGE SURFACE | r10 = ∞ | | |

FIG. 22

$|\beta| = 0.8$ TIMES

S4 LENS SURFACE SHAPE

DEFINITION EXPRESSION (XY POLYNOMIAL EXPRESSION SURFACE)

$r^2 = x^2 + y^2$ AND $$\frac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$$

x: COORDINATE IN MAIN DIRECTION, y: COORDINATE IN SUB-DIRECTION
c: CURVATURE ON OPTICAL AXIS, K: CONIC CONSTANT, A TO I: ASPHERIC SURFACE COEFFICIENT

VALUES OF EACH COEFFICIENT
c=1/1.1629488, K=−0.23239234,
A=0.0, B=0.01218706,
C=−0.070938545, D=−0.13485353, E=−0.072352492,
F=−0.0350071576, G=−0.11338229, H=−0.076500466, I=−0.032070924

LENS DIAMETER IN MAIN DIRECTION 1.652 mm
LENS DIAMETER IN SUB-DIRECTION 1.627 mm

FIG. 23

$|\beta| = 0.8$ TIMES

S7 LENS SURFACE SHAPE

DEFINITION EXPRESSION (XY POLYNOMIAL EXPRESSION SURFACE)

$r^2 = x^2 + y^2$ AND $$\frac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$$

x: COORDINATE IN MAIN DIRECTION, y: COORDINATE IN SUB-DIRECTION
c: CURVATURE ON OPTICAL AXIS, K: CONIC CONSTANT, A TO I: ASPHERIC SURFACE COEFFICIENT

VALUES OF EACH COEFFICIENT
$c = 1/1.10413778$, $K = -1.0$,
$A = 0.0$, $B = -0.0184065035$,
$C = -0.0323562317$, $D = -0.095618570$, $E = -0.071687893$,
$F = -0.065877638$, $G = -0.238053746$, $H = -0.266141987$, $I = 0.0094223682$

LENS DIAMETER IN MAIN DIRECTION 1.759 mm
LENS DIAMETER IN SUB-DIRECTION 1.768 mm

| | |
|---|---|
| NUMBER OF APERTURES OF IMAGE SIDE | 0.3038 |
| FULL WIDTH IN MAIN DIRECTION OF SPOT GROUP OF IMAGE SIDE Wsm | 0.582 mm |
| FULL WIDTH IN SUB-DIRECTION OF SPOT GROUP OF IMAGE SIDE Wss | 0.063 mm |

EXPOSURE HEAD AND IMAGE FORMING APPARATUS

BACKGROUND

1. Technical Field

The present invention relates to an exposure head for making an image by using lights from light emitting elements through an image forming optical system and an image forming apparatus using the same.

2. Related Art

JP-A-2009-098613 discloses an exposure head including a plurality of light emitting elements arranged in a zigzag manner in the main scanning direction, and an image forming optical system facing the plurality of light emitting elements. That is, in the exposure head, by making an image by using a plurality of lights emitted from the light emitting elements through the image forming optical system, spots of the plurality of lights are arranged in the main scanning direction and the plurality of lights are irradiated onto a surface to be exposed. Then, the surface to be exposed is exposed by the spots.

As described above, the exposure head exposes the surface to be exposed by the plurality of spots arranged in the main scanning direction. Thus, in order to realize exposure with high accuracy, it is necessary to form each spot such that various conditions are satisfied. Among the conditions, it is most important to reduce aberration of the image forming optical system and sufficiently ensure the amount of lights supplied for spot formation. For compatibility of these two conditions, the magnification in the main scanning direction of the image forming optical system serves as an important parameter. That is, if the magnification in the main scanning direction is large, the aberration is increased. Meanwhile, if the magnification in the main scanning direction is small, light use efficiency is reduced, so that the amount of lights supplied for spot formation is reduced. However, these points have not been sufficiently considered in the related art.

SUMMARY

An advantage of some aspects of the invention is to provide a technology capable of realizing exposure with high accuracy by reducing the aberration of an image forming optical system and sufficiently ensuring the amount of lights supplied for spot formation.

According to one aspect of the invention, there is provided an exposure head including: a light emitting element array including light emitting elements disposed in a first direction; a light blocking member including an aperture stop through which lights emitted from the light emitting elements pass; and an image forming optical system that makes an image by using the lights having passed through the light blocking member, wherein an absolute value of a magnification in the first direction of the image forming optical system is equal to or more than 0.7 times and is equal to or less than 0.8 times.

According to another aspect of the invention, there is provided an image forming apparatus including: a latent image carrier on which a latent image is formed; an exposure head; and a development unit that develops the latent image formed on the latent image carrier by the exposure head, wherein the exposure head includes: a light emitting element array including light emitting elements disposed in a first direction; a light blocking member including an aperture stop through which lights emitted from the light emitting elements pass; and an image forming optical system that allows the lights having passed through the light blocking member to transmit therethrough so that the latent image carrier is exposed, wherein an absolute value of a magnification in the first direction of the image forming optical system is equal to or more than 0.7 times and is equal to or less than 0.8 times.

In the invention (the exposure head and image forming apparatus) configured as mentioned above, since the magnification in the first direction of the image forming optical system is equal to or less than 0.8 times, the aberration of the image forming optical system may be reduced. Since the magnification in the first direction of the image forming optical system is equal to or more than 0.7 times, the reduction of light use efficiency is suppressed, so that the amount of lights supplied for spot information may be ensured to be sufficient. As a result, exposure with high accuracy may be realized.

At this time, the image forming optical system may include a first lens and a second lens, and the lights emitted from the light emitting elements may be configured to be imaged after being transmitting through the first lens and then the second lens. That is, the image forming optical system includes two lenses, thereby facilitating the fabrication of an image forming optical system in which the absolute value of the magnification in the first direction is equal to or more than 0.7 times and equal to or less than 0.8 times.

In addition, the image forming optical system may be an anamorphic optical system. This is because the anamorphic optical system has the advantage of suppressing the aberration.

For reference, the first lens and the second lens may be configured by a resin lens. Thus, an aspheric lens having a complicated shape, in which the curvatures in a main scanning direction and a sub-scanning direction are different from each other, may be reproduced with high accuracy.

Furthermore, it is preferable to apply the invention to the configuration in which the light emitting elements are organic EL elements, and the light emitting element array includes a head substrate made of glass, on which the organic EL elements are disposed, and a sealing member that seals the organic EL elements. The reason for this is as follows. That is, the organic EL element has characteristics in which heat is generated as light emission is performed, and simultaneously has characteristics in which the life span is reduced due to the deterioration caused by the heat. Consequently, from the standpoint of long life span of the organic EL element, it is preferable to promote heat dissipation from the organic EL element. However, in the configuration in which the organic EL elements are surrounded by the head substrate made of glass and the sealing member made of glass, it is difficult to promote the heat dissipation from the organic EL element. In this regard, in order to suppress the heat generation amount of the organic EL element, it is necessary to control the amount of lights emitted from the organic EL element. Meanwhile, since the image forming optical system of the invention has a relatively high light use efficiency with respect to a diffusion light source such as the organic EL element, it may be possible to sufficiently ensure the amount of lights supplied for the spot formation while suppressing the light amount from the organic EL element. Consequently, the deterioration of the organic EL element can be suppressed by controlling the light amount of the organic EL element, and exposure with high accuracy may be performed.

Specifically, when the light emitting element array is a bottom emission type organic EL element array, it is difficult to bring a large light amount of the organic EL element. In this regard, it is preferable to improve light use efficiency by applying the invention to such a configuration.

In addition, in the configuration in which the exposure head further includes a driving circuit disposed on the head substrate to drive the organic EL element, heat from the driving circuit may be transferred to the organic EL element. In this regard, in order to suppress heat deterioration of the organic EL element, it is preferable to control the light amount of the organic EL element. Thus, the degree of light use efficiency is increased by applying the invention to such a configuration, so that the light amount from the organic EL element may be suppressed and the amount of lights supplied for the spot formation may be ensured to be sufficient, resulting in the realization of exposure with high accuracy.

BRIEF DESCRIPTION OF THE DRAWINGS

The invention will be described with reference to the accompanying drawings, wherein like numbers reference like elements.

FIG. 16 is a diagram showing lens data of an image forming optical system when an absolute value of a magnification is 0.70 times.

FIG. 17 is a diagram showing data when the surface shape of the surface S4 of FIG. 16 is applied.

FIG. 18 is a diagram showing data when the surface shape of the surface S7 of FIG. 16 is applied.

FIG. 21 is a diagram showing lens data of an image forming optical system when an absolute value of a magnification is 0.80 times.

FIG. 22 is a diagram showing data when the surface shape of the surface S4 of FIG. 21 is applied.

FIG. 23 is a diagram showing data when the surface shape of the surface S7 of FIG. 21 is applied.

DESCRIPTION OF EXEMPLARY EMBODIMENTS

First Embodiment

Figure 1:
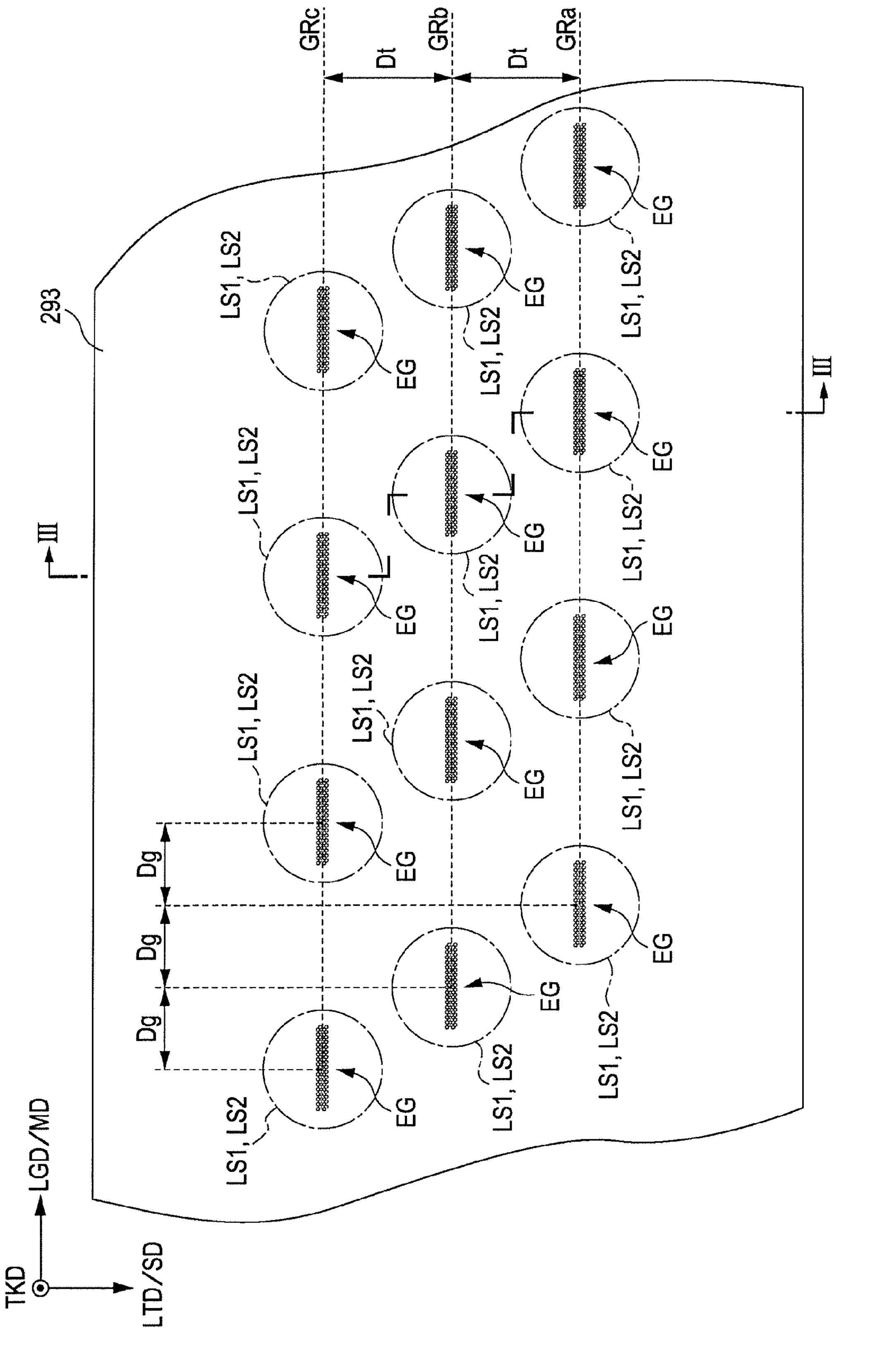
FIG. 1 is a plan view showing one example of a line head to which the present invention can be applied.
Figure 2:
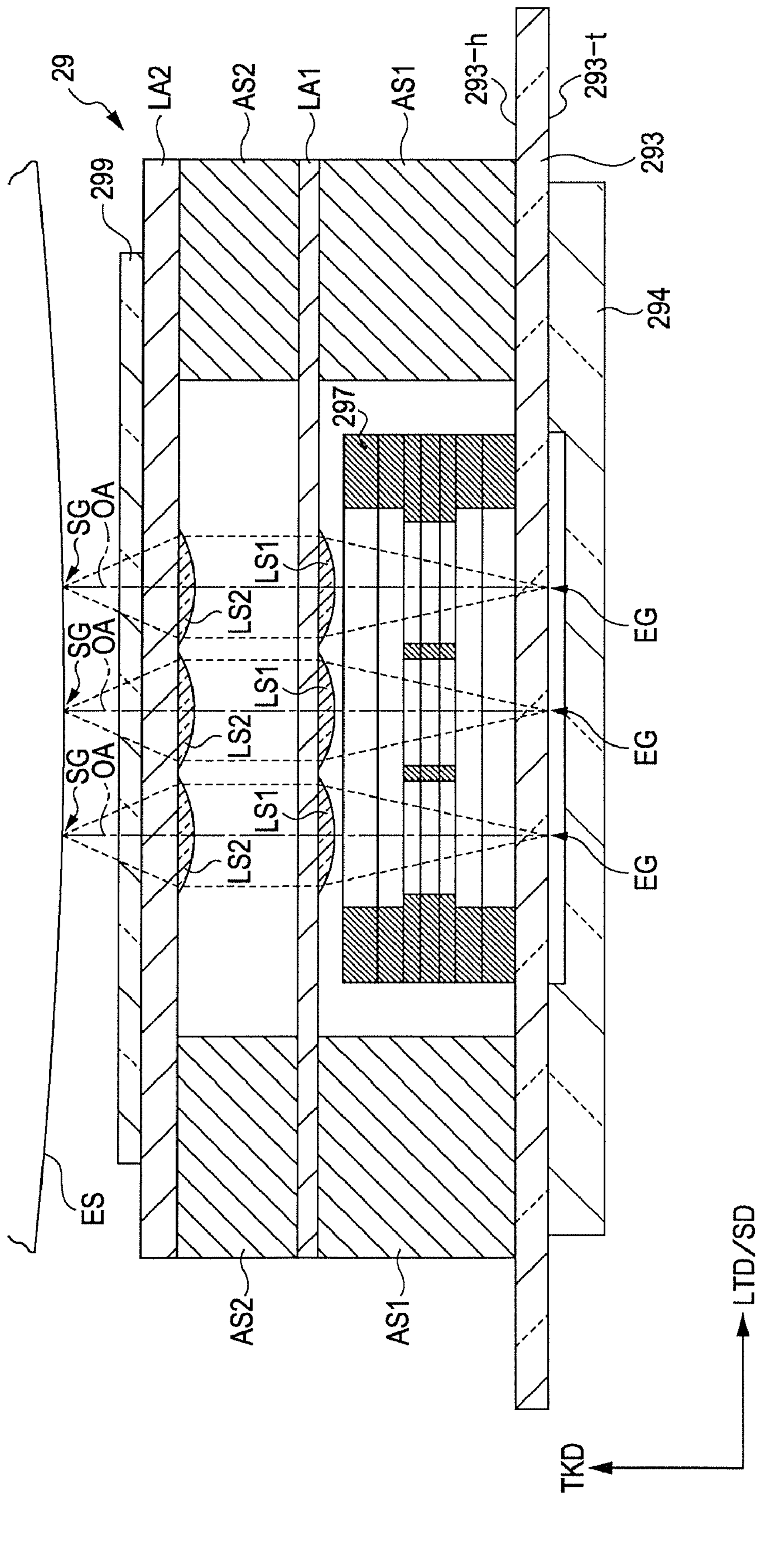
FIG. 2 is a partial offset sectional view showing one example of a line head to which the present invention can be applied.

FIGS. 1 and 2 are diagrams showing one example of a line head to which the present invention can be applied. Specifically, FIG. 1 is a plan view when the positional relationship between light emitting elements and lenses provided in the line head 29 is seen from the thickness direction TKD of the line head 29. FIG. 2 is a partial offset sectional view taken along line I-I (a stepped two-dot chain line of FIG. 1) of the line head 29, which corresponds to when the section is seen from the longitudinal direction LGD of the line head 29. The line head 29 is long in the longitudinal direction LGD while being short in the width direction LTD, and has a predetermined thickness (a height) in the thickness direction TKD. The following drawings including FIGS. 1 and 2 show the longitudinal direction LGD, the width direction LTD, and the thickness direction TKD of the line head 29 if necessary. In addition, these directions LGD, LTD and TKD are perpendicular or substantially perpendicular to one another. Furthermore, in the following description, an arrow side in the thickness direction TKD is written as “front” or “upper”, and an opposite side of the arrow in the thickness direction TKD is written as “rear” or “lower”.

Furthermore, as described later, when the line head 29 is applied to an image forming apparatus, the line head 29 performs exposure with respect to a surface ES to be exposed which moves in the sub-scanning direction SD perpendicular or substantially perpendicular to the main scanning direction MD. In addition, the main scanning direction MD of the surface ES to be exposed is parallel or substantially parallel to the longitudinal direction LGD of the line head 29, and the sub-scanning direction SD of the surface ES to be exposed is parallel or substantially parallel to the width direction LTD of the line head 29. If necessary, the main scanning direction MD and the sub-scanning direction SD are shown together with the longitudinal direction LGD and the width direction LTD.

Figure 5:
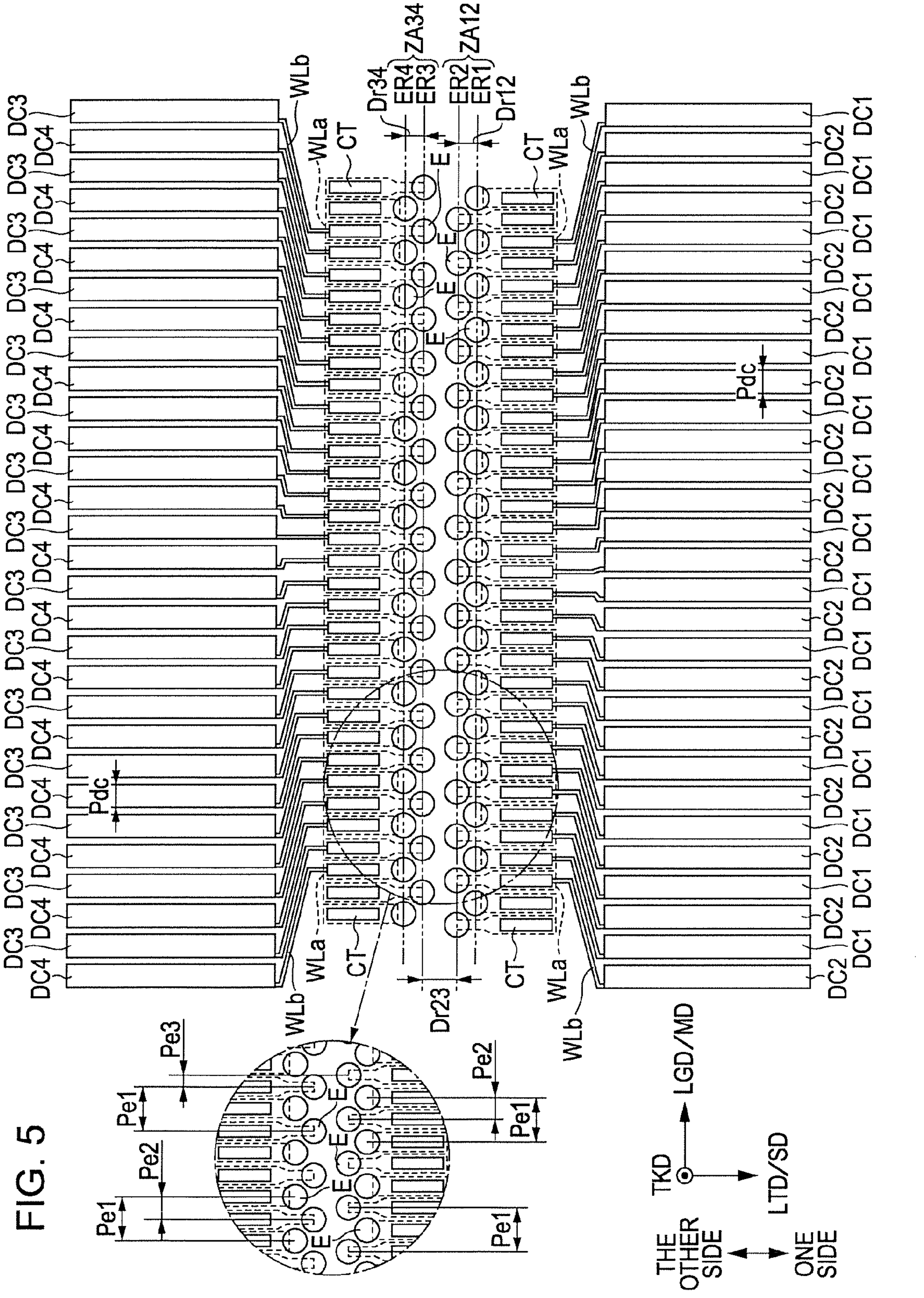
FIG. 5 is a partial plan view showing the arrangement configuration of light emitting elements of a light emitting element group.

In the line head 29 in accordance with the first embodiment, a plurality of light emitting elements E are grouped to form one light emitting element group EG (the arrangement configuration of the light emitting elements E will be described in detail with reference to FIG. 5). In addition, a plurality of light emitting element groups EG are discretely arranged in a zigzag manner (3 row zigzag, see FIG. 1). In this way, the plurality of light emitting element groups EG in different rows are shifted relative to one another by a distance Dg in the longitudinal direction LGD while being shifted relative to one another by a distance Dt in the width direction LTD. In addition, when the perspective is changed, three light emitting element group rows GRa, GRb and GRc are disposed at different positions in the width direction LTD, wherein each of the light emitting element group rows GRa, GRb and GRc includes the plurality of light emitting element groups EG are linearly arranged in the longitudinal direction.

Furthermore, each light emitting element E is an organic EL (ElectroLuminescence) element having the same light emitting spectrum. In addition, these organic EL elements are formed on the rear surface 293-*t* of a head substrate 293 serving as a glass flat plate which is long in the longitudinal direction LGD while being short in the width direction LTD, and are sealed by a sealing member 294 made of glass. That is, the head substrate 293 and the sealing member 294 constitute a bottom emission-type organic EL element array. In addition, the sealing member 294 is fixed to the back side 293-*t* of a head substrate 293 by using adhesive.

One image forming optical system faces each of the plurality of light emitting element groups EG. The image forming optical system includes two convex lenses LS1 and LS2 provided at the side of each light emitting element group EG. In addition, FIG. 1 shows the lenses LS1 and LS2 by using a circle shown by a dashed-dotted line. That is, FIG. 1 shows the positional relationship between the light emitting element group EG and the lenses LS1 and LS2 from a plan view in the thickness direction TKD, and does no show that the lenses LS1 and LS2 are directly formed on the head substrate 293. Moreover, FIG. 2 shows a member 297 interposed between the light emitting element group EG and the image forming optical system LS1 and LS2, which will be described after the image forming optical system is described.

In the line head 29, since the lenses LS1 and LS2 are disposed to face each of the plurality of light emitting element groups EG arranged in the 3 row zigzag manner, both a lens array LA1 including a plurality of lenses LS1 arranged in the 3 row zigzag manner and a lens array LA2 including a plurality of lenses LS2 arranged in the 3 row zigzag manner are provided. That is, in the lens array LA1 (LA2), the plurality of lenses LS1 (LS2) in different rows are shifted relative to one another by the distance Dg in the longitudinal direction LGD while being shifted relative to one another by the distance Dt in the width direction LTD.

For reference, the lens array LA1 (LA2) can be configured by forming the lens LS1 (LS2) made of resin on a light transmitting glass flat plate. In addition, in this embodiment, in view of the fact that it is difficult to allow the lens array LA1 (LA2) long in the longitudinal direction LGD to have an integral configuration, the lenses LS1 (LS2) made of resin are arranged in the 3 row zigzag manner on the relatively short glass flat plate to create one short lens array, and a plurality of short lens arrays are arranged in the longitudinal direction LGD to create the lens array LA1 (LA2) long in the longitudinal direction LGD.

In more detail, spacers AS1 disposed at both ends in the width direction LTD of the front surface 293-*h* of a head substrate 293, and each of a plurality of short lens arrays arranged in the longitudinal direction LGD is provided on the spacers AS1 to configure one lens array LA1. Furthermore, spacers AS2 are disposed at both sides in the width direction LTD of the surface of the lens array LA1, and each of a plurality of short lens arrays arranged in the longitudinal direction LGD is provided on the spacers AS2 to configure one lens array LA2. In addition, a support glass 299 having a flat plate shape is adhered to the surface of the lens array LA2, and the short lens arrays constituting the lens array LA2 are also supported by both the spacers AS2 and the support glass 299 from the opposite side of the spacers AS2. Moreover, the support glass 299 also has a function of covering the lens array LA2 to prevent the lens array LA2 from being exposed to the outside.

In this way, the lens arrays LA1 and LA2 arranged at a predetermined interval face the head substrate 293 in the thickness direction TKD. Thus, the image forming optical systems LS1 and LS2 having an optical axis OA parallel or substantially parallel to the thickness direction TKD face the light emitting element group EG, and lights emitted from each light emitting elements E of the light emitting element group EG are irradiated onto the surface ES to be exposed after sequentially transmitting through the head substrate 293, the image forming optical systems LS1 and LS2, and the support glass 299 (refer to the broken line of FIG. 2). Consequently, the lights emitted from each light emitting element E of the light emitting element group EG are irradiated onto the surface ES to be exposed as a plurality of spots due to the image formation operation of the image forming optical systems LS1 and LS2, thereby forming spot groups SG including the plurality of spots on the surface ES to be exposed. For reference, the image forming optical systems LS1 and LS2 form inverted images (the magnification β is negative) and serves as an inversion reduction optical system having an absolute value of the magnification β (the image formation magnification) which is smaller than 1. Specifically, in the first embodiment, the absolute value of the magnification β in the main scanning direction MD (the longitudinal direction LGD) is set to be equal to or more than 0.7 times and be equal to or less than 0.8 times. In addition, the reason for this will be described in detail later.

As can be understood from the above description, according to the line head 29 in accordance with the first embodiment, the image forming optical systems LS1 and LS2 are dedicated and disposed for each of the plurality of light emitting element groups EG. In such a line head 29, it is preferable that the lights from the light emitting element groups EG are incident only into the image forming optical systems provided for the light emitting element groups EG, and are not incident into other image forming optical systems. In this regard, in the first embodiment, the light blocking member 297 is provided between the front surface 293-*h* of the head substrate 293 and the lens array LA1.

Figure 3:
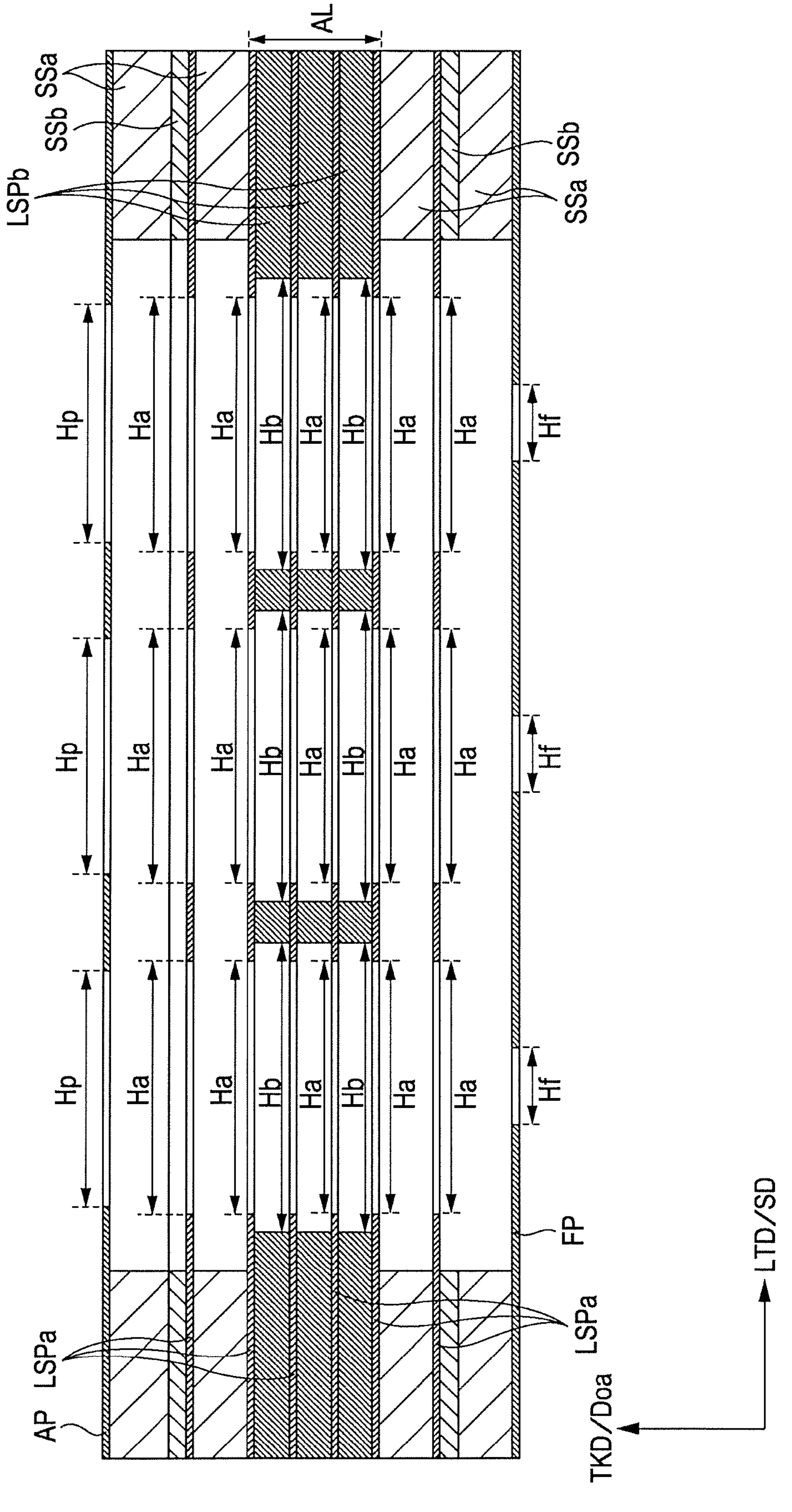
FIG. 3 is an offset sectional view taken along line I-I of a light blocking member.
Figure 4:
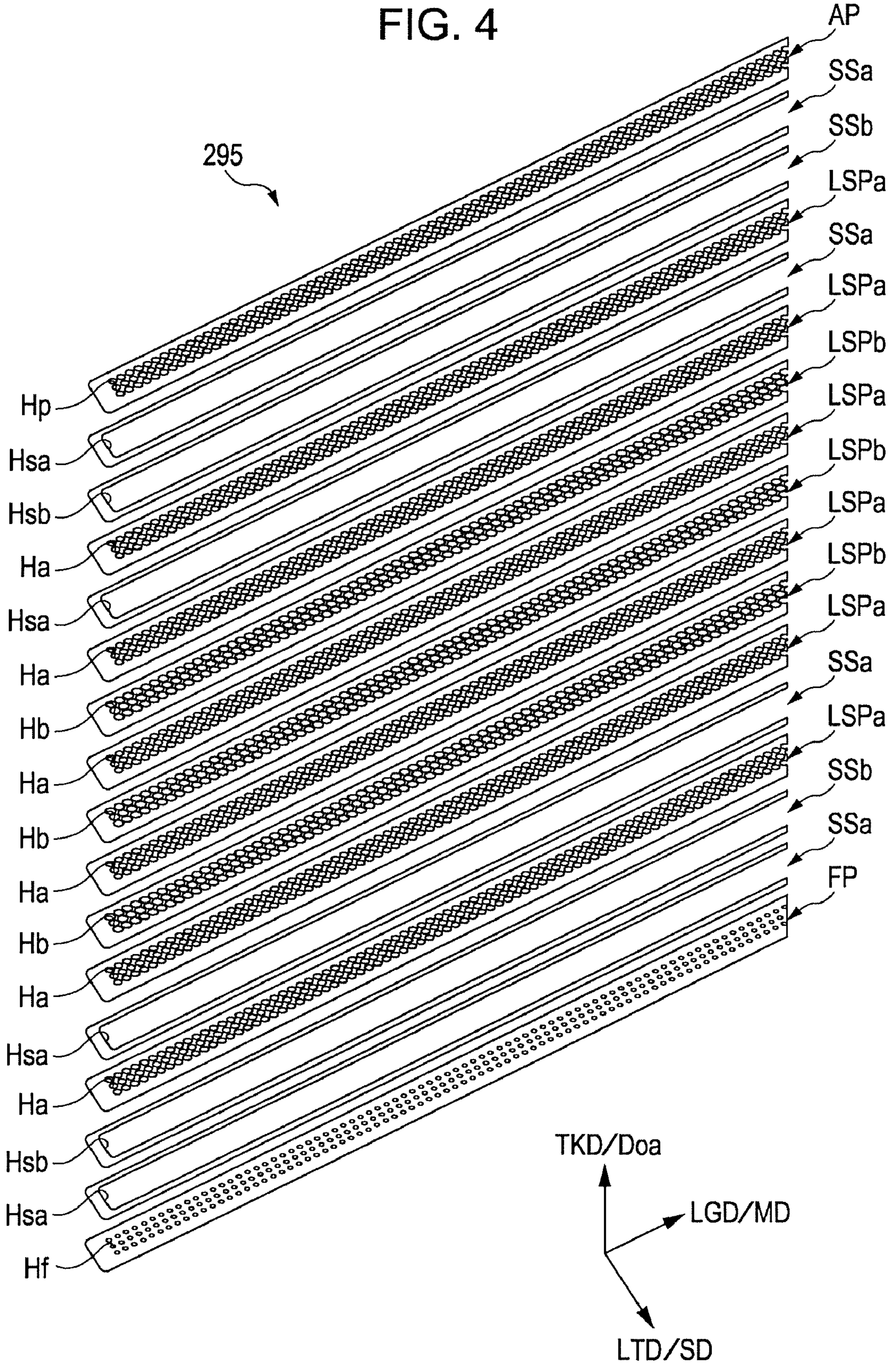
FIG. 4 is an exploded perspective view of a light blocking member.

FIG. 3 is an offset sectional view taken along line I-I of the light blocking member and FIG. 4 is an exploded perspective view of the light blocking member. FIGS. 3 and 4 show a light traveling direction Doa which is parallel to the optical axis OA and directed to the surface ES to be exposed from the light emitting element groups EG (the light traveling direction Doa is parallel or substantially parallel to the thickness direction TKD). As shown in FIGS. 3 and 4, the light blocking member 297 includes a first light blocking flat plate FP, a second light blocking flat plate LSPa, a third light blocking flat plate LSPb, an aperture plate AP, and first and second spacers SSa and SSb that define intervals among the flat plates FP, LSPa, LSPb and AP. In detail, the light blocking member 297 has a configuration in which these flat plates and the spacers are stacked in the thickness direction TKD and are adhered to one another by using adhesive.

Any one of the flat plates FP, LSPa, LSPb and AP has a function of allowing a part of the lights from the light emitting element groups EG to pass therethrough, and blocking a remaining part of the lights. The first light blocking flat plate FP is formed with openings Hf, the second light blocking flat plate LSPa is formed with openings Ha, the third light blocking flat plate LSPb is formed with openings Hb, and the aperture plate AP is formed with openings Hp between the light emitting element groups EG and the image forming optical systems LS1 and LS2 facing the light emitting element groups EG. These openings Hf, Ha, Hb and Hp are positioned such that the geometric center of gravity coincides or substantially coincides with the optical axes of the image forming optical systems LS1 and LS2. That is, as shown in FIGS. 3 and 4, the circular openings Hf, Ha, Hb and Hp allowing passage in the thickness direction TKD are arranged in the flat plates FP, LSPa, LSPb and AP in the 3 row zigzag manner in correspondence with the 3 row zigzag arrangement of the light emitting element groups EG. Among the lights emitted from the light emitting element groups EG, lights having passed through the openings Hf, Ha, Hb and Hp are incident into the image forming optical systems LS1 and LS2, and most of the remaining lights are blocked by the flat plates FP, LSPa, LSPb and AP. In addition, thicknesses of the flat plates FP, LSPa, LSPb and AP satisfy the magnitude relation (FP≅AP≅LSPa<LSPb), and the diameters of the openings Hf, Ha, Hb and Hp satisfy the magnitude relation (Hf<Hp<Ha<Hb).

The spacers SSa and SSb are frame bodies formed with long holes Hsa and Hsb having a substantially rectangular shape and allowing passage in the thickness direction TKD, respectively. When seeing the light blocking member 297 from the thickness direction TKD in a plan view, the long holes Hsa and Hsb have a sufficient size to include each of the openings Hf, Ha, Hb and Hp therein, respectively. Thus, the lights emitted from each light emitting element group EG travel through the long holes Hsa and Hsb and travel toward the surface ES to be exposed (refer to FIG. 2).

Next, a more detailed arrangement configuration of the light blocking member 297 will be described. The first light blocking flat plate FP is mounted on/fixed to the front surface 293-*h* (FIG. 2) of a head substrate 293, and the second light blocking flat plate LSPa is further disposed at the side of the light traveling direction Doa of the first light blocking flat plate FP. Two spacers SSa and SSb are interposed between the first light blocking flat plate FP and the second light blocking flat plate LSPa. A stray light absorption layer AL configured from two types of flat plates is disposed at the side of the light traveling direction Doa of the second light blocking flat plate LSPa, and the first spacer SSa is interposed between the second light blocking flat plate LSPa and the stray light absorption layer AL. The stray light absorption layer AL is obtained by alternately stacking two types of the light blocking flat plates LSPa and LSPb, which have opening sizes and thicknesses different from each other, in the light traveling direction Doa. In detail, the stray light absorption layer AL includes four sheets of the second light blocking flat plate LSPa and three sheets of the third light blocking flat plate LSPb. The second light blocking flat plate LSPa and the aperture plate AP are sequentially disposed at the side of the light traveling direction Doa of the stray light absorption layer AL. Furthermore, the spacer SSa is interposed between the stray light absorption layer AL and the second light blocking flat plate LSPa, and the two spacers SSa and SSb are interposed between the second light blocking flat plate LSPa and the aperture plate AP.

As described above, the light blocking member 297 is provided, so that the plurality of openings Hf, Ha, Hb and Hp are arranged between each light emitting element group EG and the image forming optical systems LS1 and LS2, which face the light emitting element group EG, in the light traveling direction Doa. As a result, among the lights emitted from the light emitting element groups EG, lights having passed through the openings Hf, Ha, Hb and Hp facing the light emitting element groups EG reach the image forming optical systems LS1 and LS2, and most of the remaining lights do not reach the image forming optical systems LS1 and LS2 because they are blocked by the light blocking flat plates FP, LSPa, LSPb and AP. In this way, reliable exposure, that is rarely affected by "ghosting" effects, can be realized.

Next, an arrangement configuration of the light emitting elements E of the light emitting element group EG will be described. FIG. 5 is a partial plan view showing the arrangement configuration of the light emitting elements of the light emitting element group. The circle shown by a dashed-dotted line located at the left end of FIG. 5 is a selection of the range surrounded by a dashed-dotted line located at the approximate center of FIG. 5. FIG. 5 shows the configuration of the rear surface 293-*t* of a head substrate 293. All the configurations shown in FIG. 5 are formed on the rear surface 293-*t* of a head substrate 293. The light emitting element group EG is obtained by making a plurality of circular light emitting elements E (17×4 rows) having a diameter of 27.5 μm into one group. That is, as shown in FIGS. 5, 17 light emitting elements E are linearly arranged at a pitch Pe1 (=60 μm) in the longitudinal direction LGD to configure a light emitting element row ER. In addition, one light emitting element group EG includes the light emitting element rows ER1 to ER4 of four rows which are disposed at different positions in the width direction LTD.

For reference, the reason for allowing the light emitting element E to have a diameter of 27.5 μm is as follows. That is, the light from the light emitting element E is imaged by the magnification β, so that spots are formed on the surface ES to be exposed. At this time, in order to realize high resolution exposure with a resolution of 1200 dpi (dot per inch) to 4800 dpi, the diameter in the main scanning direction MD of the spot needs to be set to be equal to or less than 10 μm to 30 μm. Meanwhile, as described later, in the image forming optical system in accordance with the first embodiment, the absolute value of the magnification β in the main scanning direction MD is set to 0.7 times to 0.8 times. Thus, the diameter in the main scanning direction MD of the light emitting element E may be set in advance to a value obtained by dividing the diameter in the main scanning direction MD of the spot by the magnification β in the main scanning direction MD. Consequently, the diameter of the light emitting element E is set to 27.5 μm. In addition, the diameter in the main scanning direction MD of the spot can be obtained as the diameter in the main scanning direction MD of the range being equal to or more than the half value of the peak in the beam profile of spots.

Next, the arrangement configuration of the light emitting elements E in the light emitting element group EG will be described in more detail with reference to FIG. 5. The light emitting element row ER1 and the light emitting element row ER2 are shifted from each other by a pitch Pe2 (=Pe1/2) in the longitudinal direction LGD. As a result, the light emitting elements E belonging to the light emitting element row ER1 and the light emitting elements E belonging to the light emitting element row ER2 are alternately arranged at the pitch Pe2 in the zigzag manner in the longitudinal direction LGD. Furthermore, in the same manner, the light emitting element row ER3 and the light emitting element row ER4 are shifted from each other by the pitch Pe2 in the longitudinal direction LGD. As a result, the light emitting elements E belonging to the light emitting element row ER3 and the light emitting elements E belonging to the light emitting element row ER4 are alternately arranged at the pitch Pe2 in the zigzag manner in the longitudinal direction LGD. In addition, a zigzag arrangement ZA12 including the light emitting elements E of the light emitting element rows ER1 and ER2 and a zigzag arrangement ZA34 including the light emitting elements E of the light emitting element rows ER3 and ER4 are shifted from each other by a pitch Pe3 (=Pe2/2) in the longitudinal direction LGD. As a result, four light emitting elements E belonging to the light emitting element rows ER2, ER4, ER1 and ER2 are sequentially and periodically arranged at the pitch Pe3 in the longitudinal direction LGD.

Herein, for example, the pitch in the longitudinal direction LGD of the light emitting element E can be obtained as the distance in the longitudinal direction LGD between the geometric centers of gravity of two light emitting elements E arranged at the pitch.

Furthermore, the distances Dr12, Dr23 and Dr34 in the width direction LTD among the light emitting element rows ER1 to ER4 of four rows in the light emitting element group EG are as follows. That is, the distance Dr12 between the light emitting element rows ER1 and ER2, the distance Dr23 between the light emitting element rows ER2 and ER3, and the distance Dr34 between the light emitting element rows ER3 and ER4 satisfy an integer ratio. In other words, an equation Dr12:Dr23:Dr34=1:m:n (1, m and n are natural numbers) is satisfied. Specifically, in the first embodiment, Dr12:Dr23:Dr34=1:m:n=2:3:2.

Herein, for example, the distance Dr12 is obtained as the distance in the width direction LTD between a virtual line, which is parallel in the longitudinal direction LGD after passing through the geometric center of gravity of the light emitting elements E of the light emitting element row ER1, and a virtual line which is parallel in the longitudinal direction LGD after passing through the geometric center of gravity of the light emitting elements E of the light emitting element row ER2. In the same manner, the distances Dr23 and Dr34 are obtained.

Furthermore, a plurality of driving circuits DC1 and DC2 are disposed at one side in the width direction LTD of the light emitting element group EG to drive a plurality of light emitting elements E belonging to the light emitting element rows ER1 and ER2 and constituting the zigzag arrangement ZA12. In detail, the driving circuit DC1, which drives the light emitting elements E of the light emitting element row ER1, and the driving circuit DC2, which drives the light emitting elements E of the light emitting element row ER2, are alternately arranged in the longitudinal direction LGD. These driving circuits DC1 and DC2 are linearly arranged at a pitch Pdc (>Pe2) in the longitudinal direction LGD. Each of the driving circuits DC1 and DC2 includes a thin film transistor (TFT), temporarily holds a signal value written by a plurality of driver ICs 295 which will be described later (in detail, stores a voltage value as the signal value in capacitance), and supplies a driving current corresponding to the signal value to the light emitting elements E.

In addition, in the width direction LTD, a contact CT is formed between the light emitting element E constituting the zigzag arrangement ZA12 and the driving circuit DC1, and a contact CT is formed between the light emitting element E constituting the zigzag arrangement ZA12 and the driving circuit DC2. These contacts CT are provided adjacent to the light emitting elements E constituting the zigzag arrangement ZA12 in a one-to-one fashion, and are linearly arranged at the pitch Pe2 similarly to the case of the light emitting elements E, in the longitudinal direction LGD. Each light emitting element E constituting the zigzag arrangement ZA12 is connected to the contact CT adjacent to the light emitting element E by using a wiring WLa (refer to the broken line of FIG. 5). In addition, as shown in FIG. 5, the width of the wiring WLa connecting the light emitting element E of the light emitting element row ER1 to the contact CT is approximately constant. On the other hand, the width of a wiring WLa connecting the light emitting element E of the light emitting element row ER2 to the contact CT is not constant, and a front end portion of the wiring WLa located at the light emitting element E is thinned. This is for allowing the wiring WLa to reach the light emitting element E of the light emitting element row ER2 after passing through between the light emitting elements E of the light emitting element row ER1.

Thus, the contact CT connected to the light emitting element E of the light emitting element row ER1 is connected to the driving circuit DC1 through a wiring WLb. Furthermore, the contact CT connected to the light emitting element E of the light emitting element row ER2 is connected to the driving circuit DC2 through a wiring WLb. Thus, the driving circuits DC1 and DC2 supply driving currents to the corresponding light emitting elements E through these wiring paths, respectively. In addition, as shown in FIG. 5, among the plurality of light emitting elements E constituting the zigzag arrangement ZA12, the driving circuits DC1 and DC2 are not connected to two light emitting elements E which are formed at both ends in the longitudinal direction LGD of the zigzag arrangement ZA12, respectively. That is, these light emitting elements E are dummy elements actually emitting no lights, to which the driving currents are not supplied.

Furthermore, in the same manner, a plurality of driving circuits are arranged at the other side in the width direction LTD of the light emitting element group EG at the pitch Pdc (>Pe2) in the longitudinal direction LGD. These driving circuits DC3 and DC4 are provided to drive the plurality of light emitting elements E belonging to the light emitting element rows ER3 and ER4 and constituting the zigzag arrangement ZA34. Since the relationship between the driving circuits DC3 and DC4 and the light emitting element rows ER3 and ER4 (the zigzag arrangement ZA34) is equivalent to that between the driving circuits DC1 and DC2 and the light emitting element rows ER1 and ER2 (the zigzag arrangement ZA12), a description thereof will be omitted.

As described above, the light emitting elements E of the light emitting element group EG are connected to the driving circuits DC1 to DC4 to receive the driving currents from the driving circuits DC1 to DC4, so that each light emitting element E emits a light. The current supply by the driving circuits DC1 to DC4 is controlled by the electrical configuration provided in the line head 29.

Figure 6:
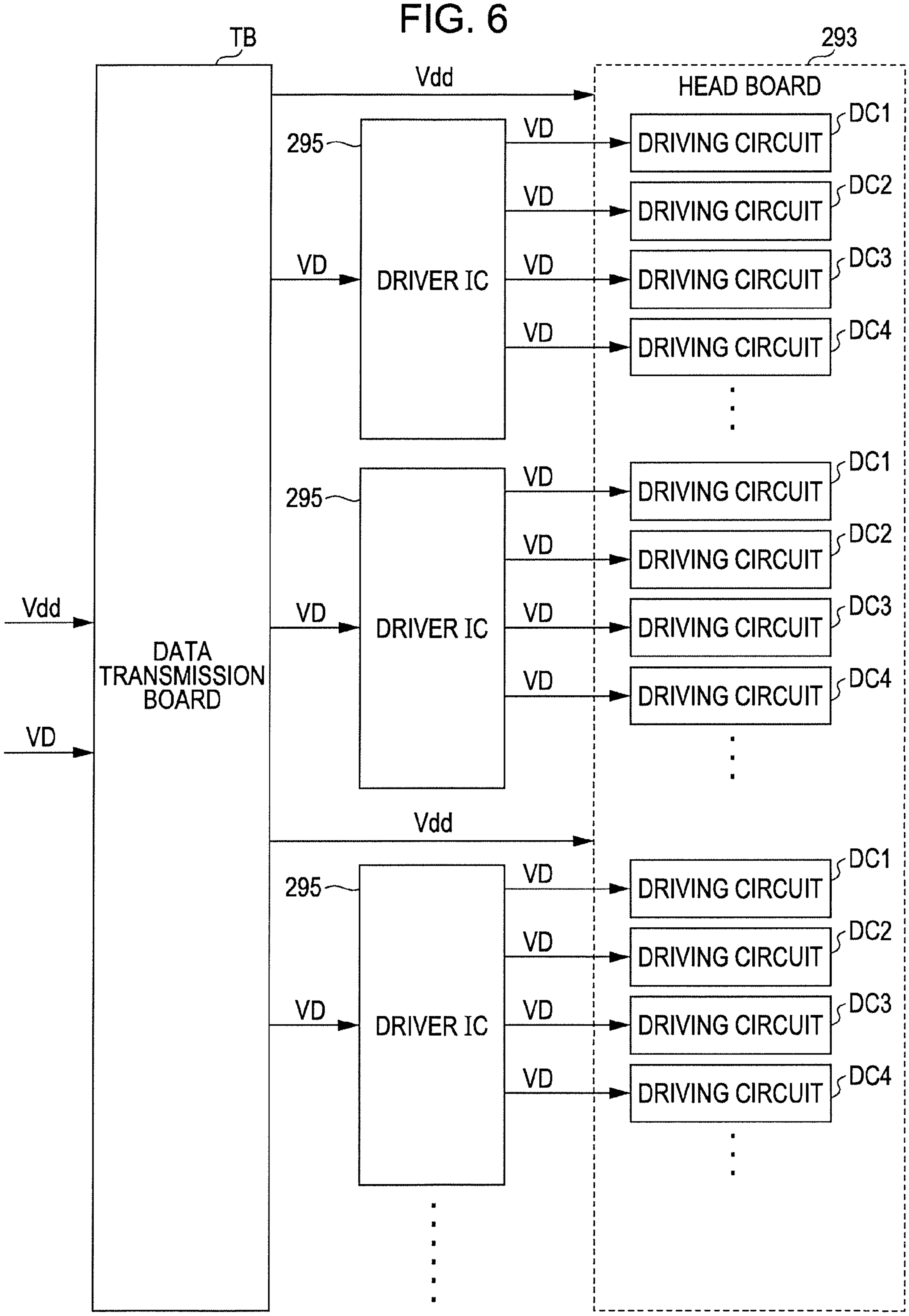
FIG. 6 is a block diagram showing the electrical configuration of a line head.

FIG. 6 is a block diagram showing the electrical configuration of the line head. As shown in FIG. 6, the electrical configuration of the line head 29 includes a data transmission board TB and the plurality of driver ICs 295, in addition to the above-mentioned driving circuits DC1 to DC4. The data transmission board TB transmits video data VD received from the outside to each driver IC 295. Furthermore, each driver IC 295 controls the emission of the light emitting elements E by writing the video data VD (in detail, video data VD converted into a voltage value) in the driving circuits DC1 to DC4. At this time, the driver IC 295 may write video data VD, which has been corrected according to the deterioration or temperature characteristics of the light emitting element E, in the driving circuits DC1 to DC4. In addition, this writing operation may be performed by so called time division driving. For reference, the data transmission board TB also has a function of supplying the head substrate 293 (the driving circuits DC1 to DC4) with a voltage Vdd supplied from the outside.

So far, the schematic configuration of the line head 29 has been described. In addition, as described above, the absolute value of the magnification β in the main scanning direction MD (the longitudinal direction LGD) is set to be equal to or more than 0.7 times and be equal to or less than 0.8 times. Hereinafter, the reason for setting the magnification as mentioned above will be described. In addition, in the following description, an expression of a main direction (or a main direction x) as a direction corresponding to the main scanning direction MD will be used appropriately, and an expression of a sub-direction (or a sub-direction y) as a direction corresponding to the sub-scanning direction SD will be used appropriately.

Figure 7:
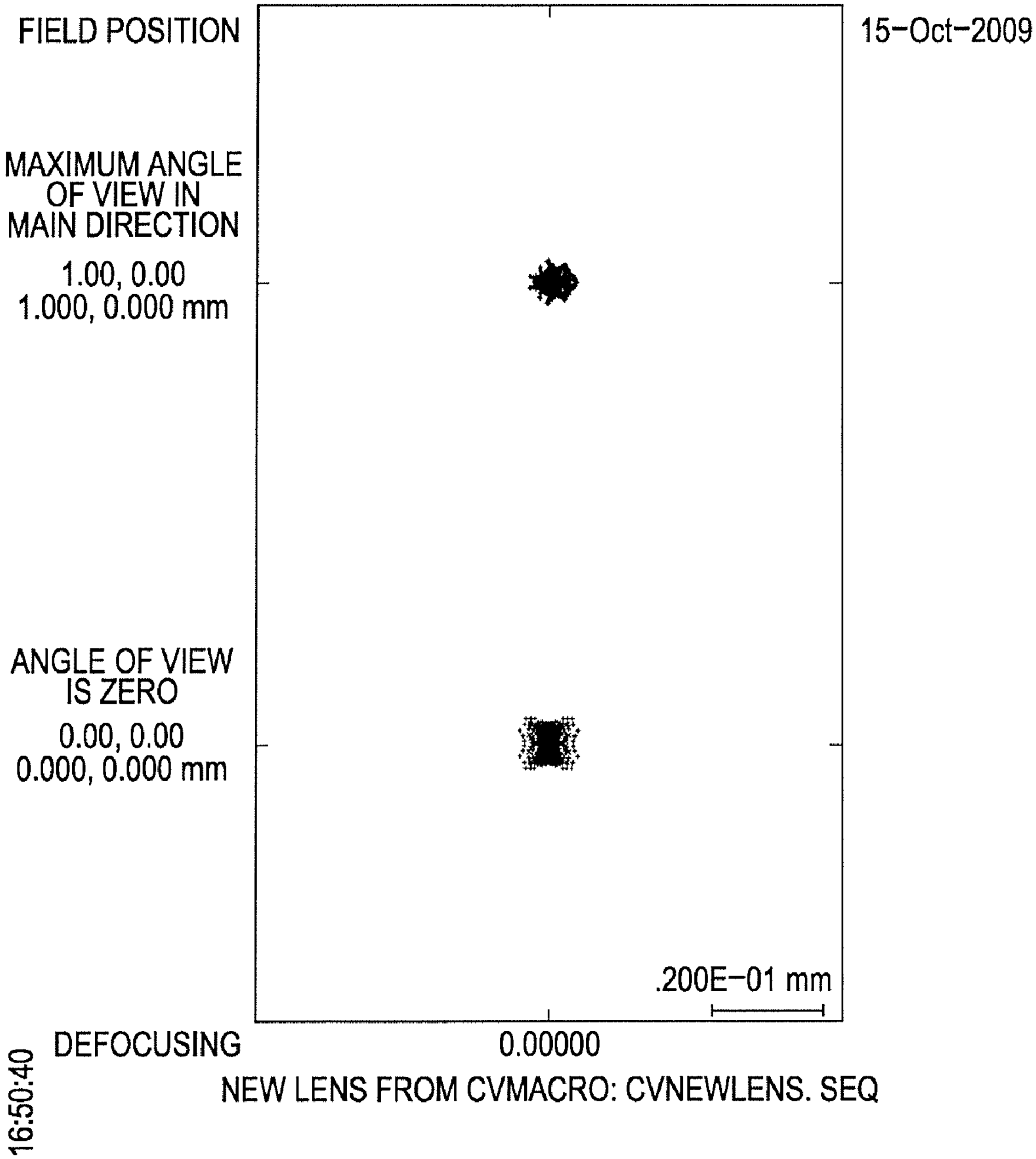
FIG. 7 is a spot diagram when an absolute value of a magnification is 0.60 times.
Figure 8:
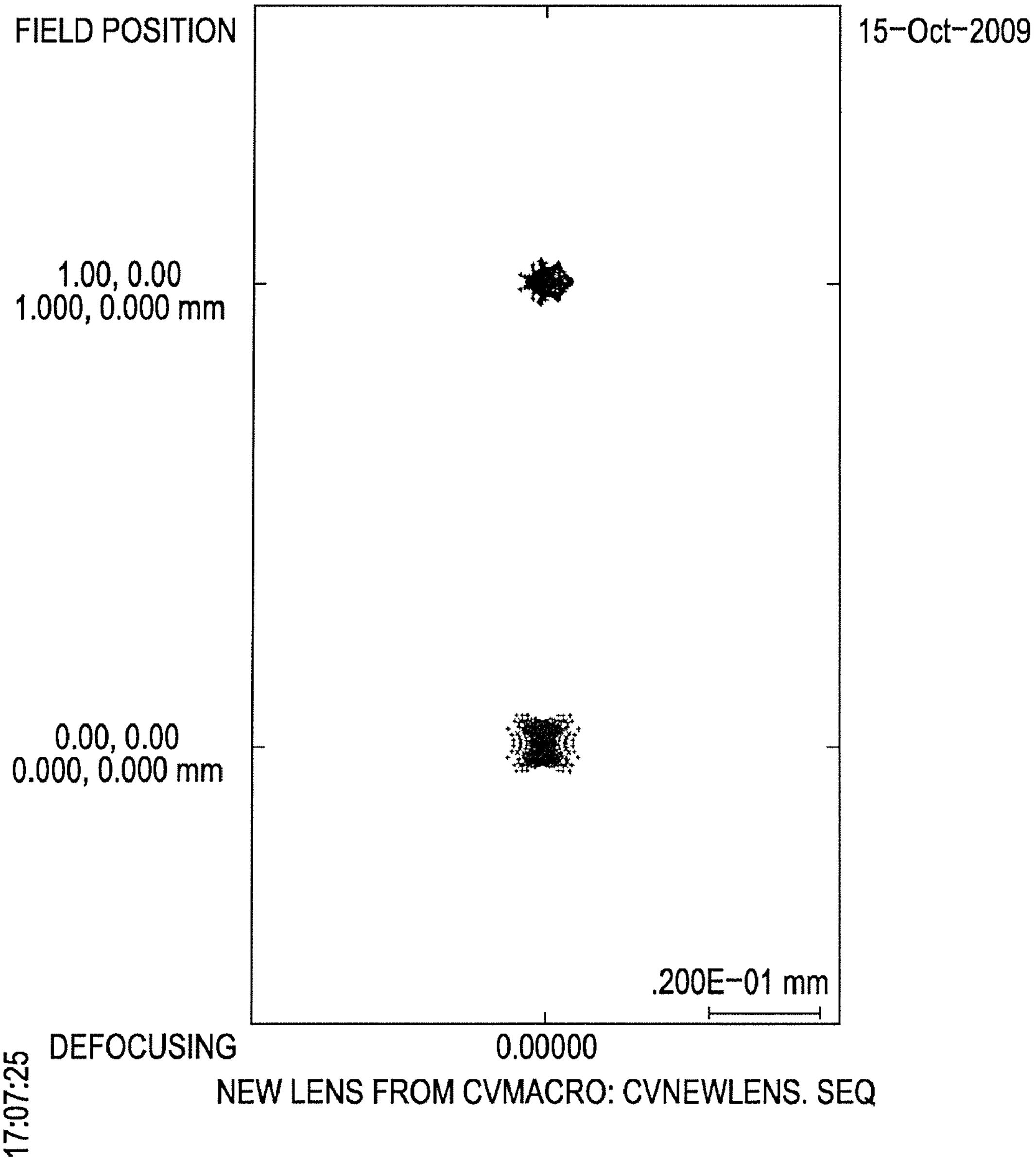
FIG. 8 is a spot diagram when an absolute value of a magnification is 0.65 times.
Figure 9:
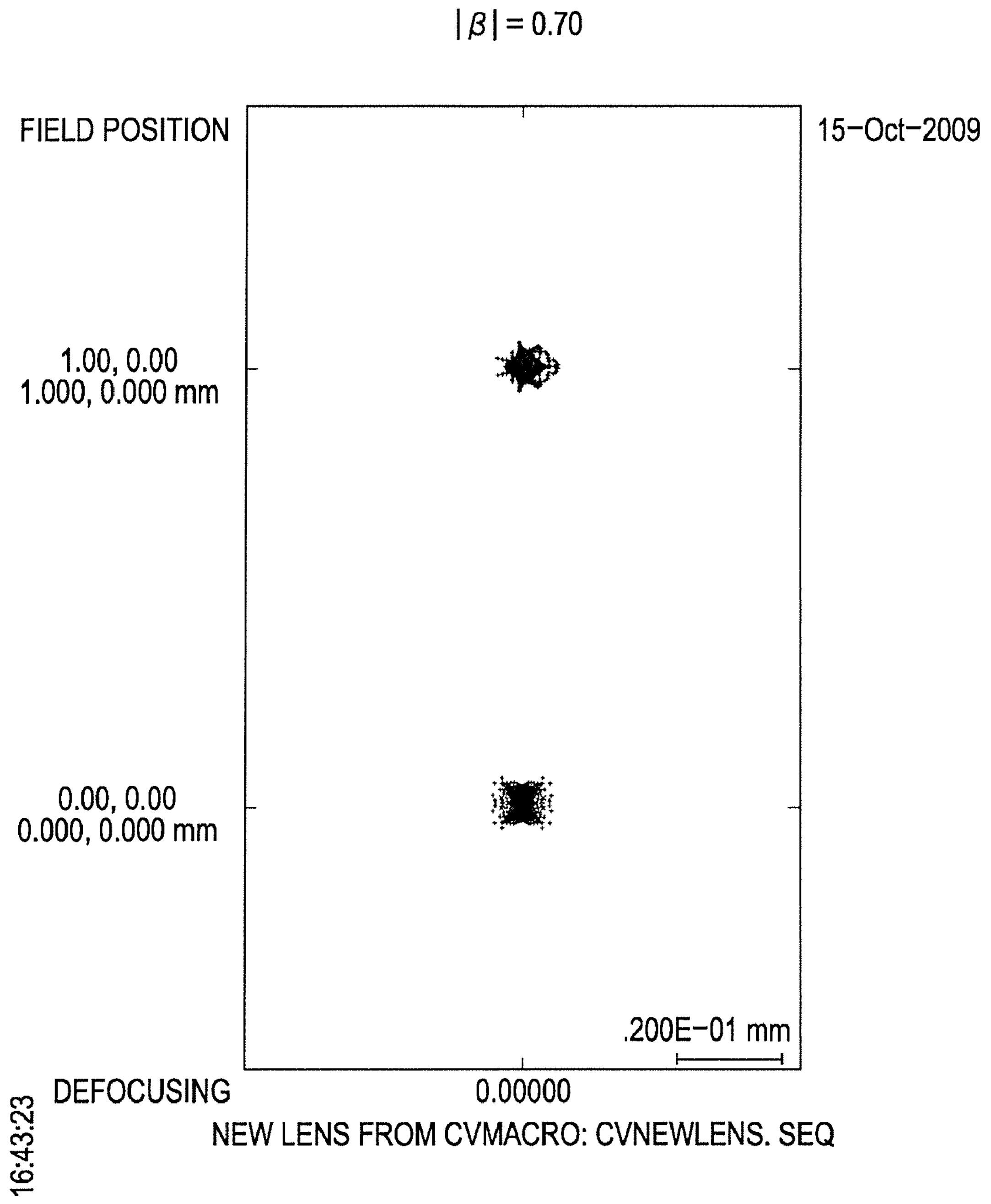
FIG. 9 is a spot diagram when an absolute value of a magnification is 0.70 times.
Figure 10:
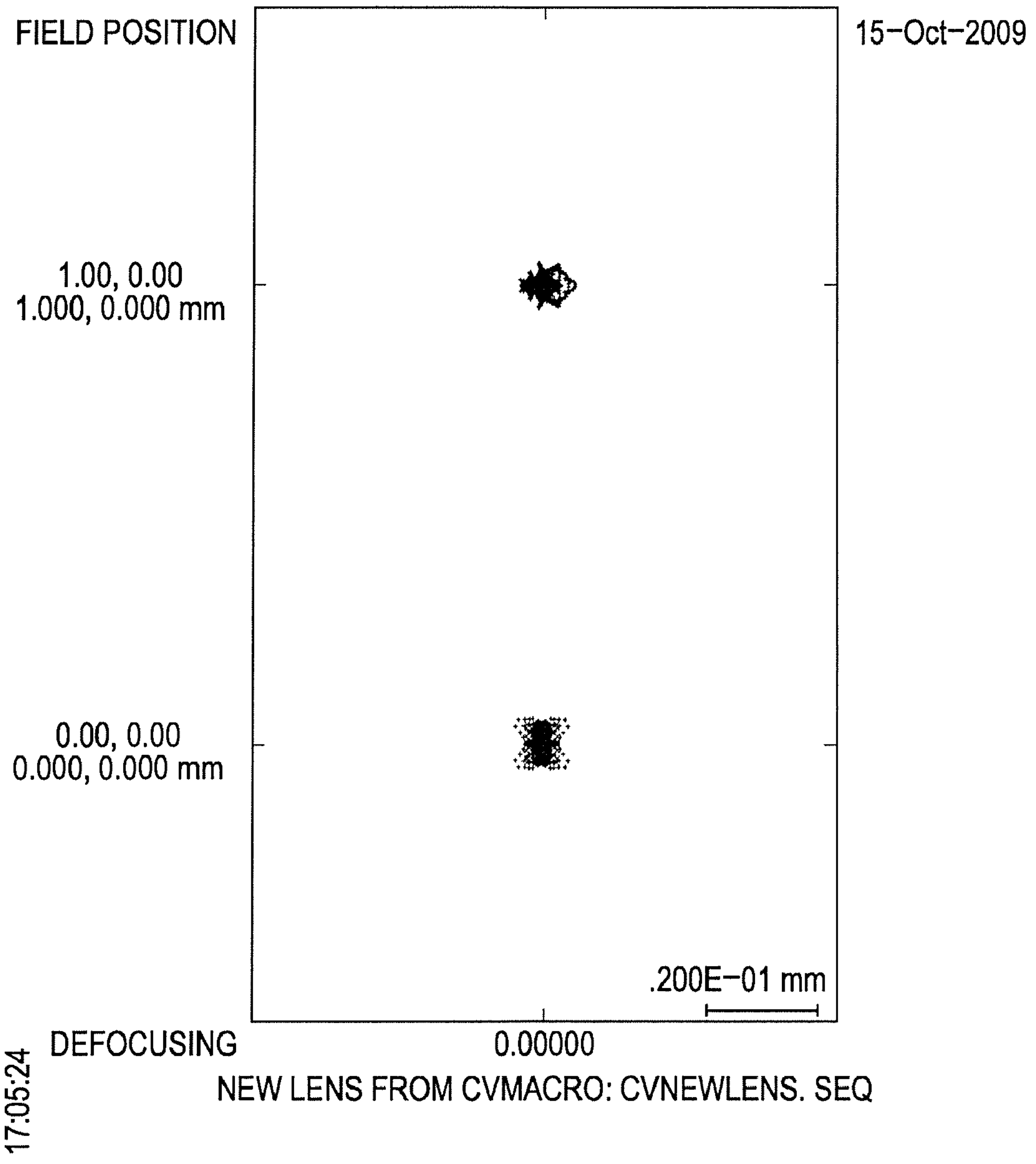
FIG. 10 is a spot diagram when an absolute value of a magnification is 0.75 times.
Figure 11:
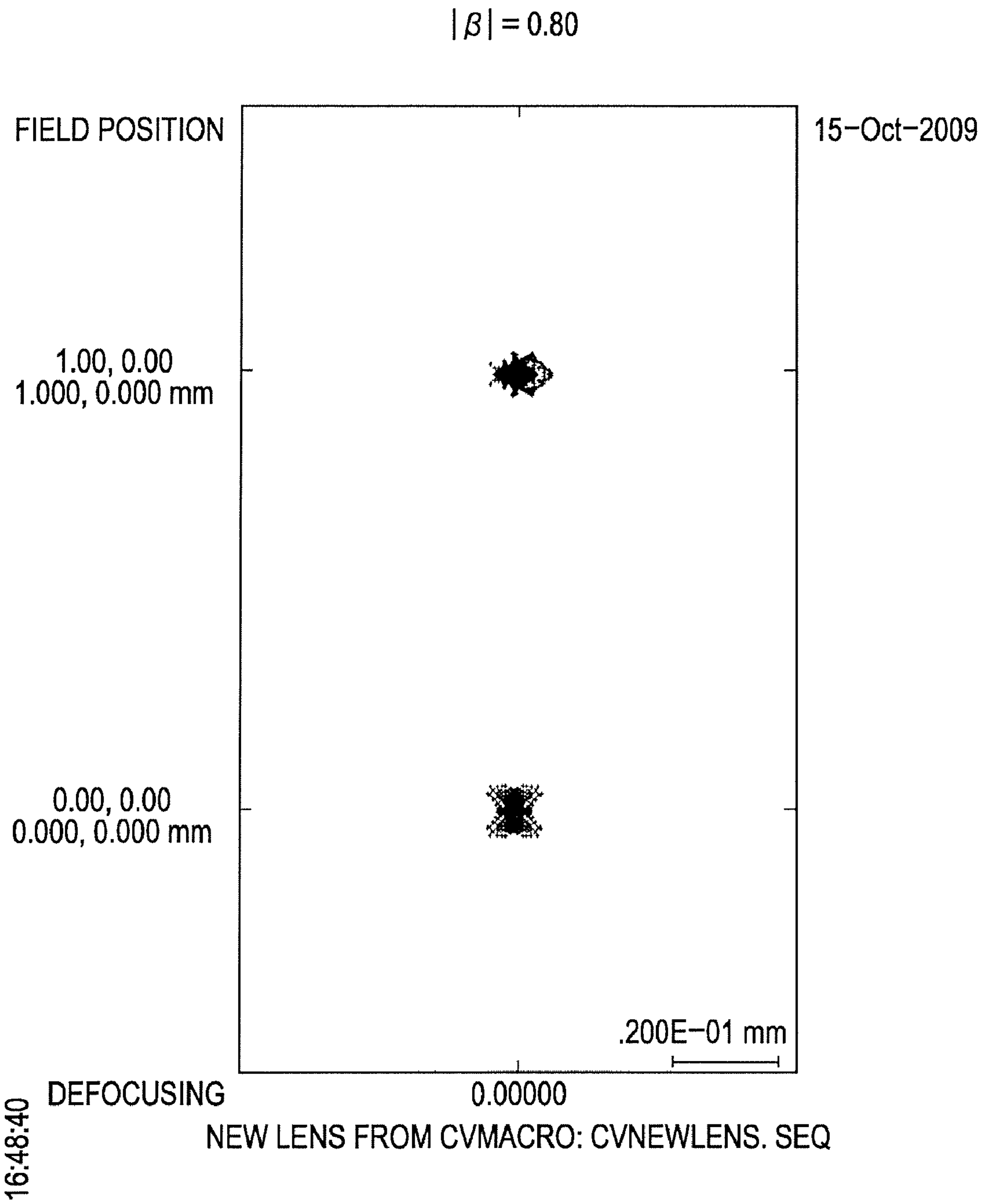
FIG. 11 is a spot diagram when an absolute value of a magnification is 0.80 times.
Figure 12:
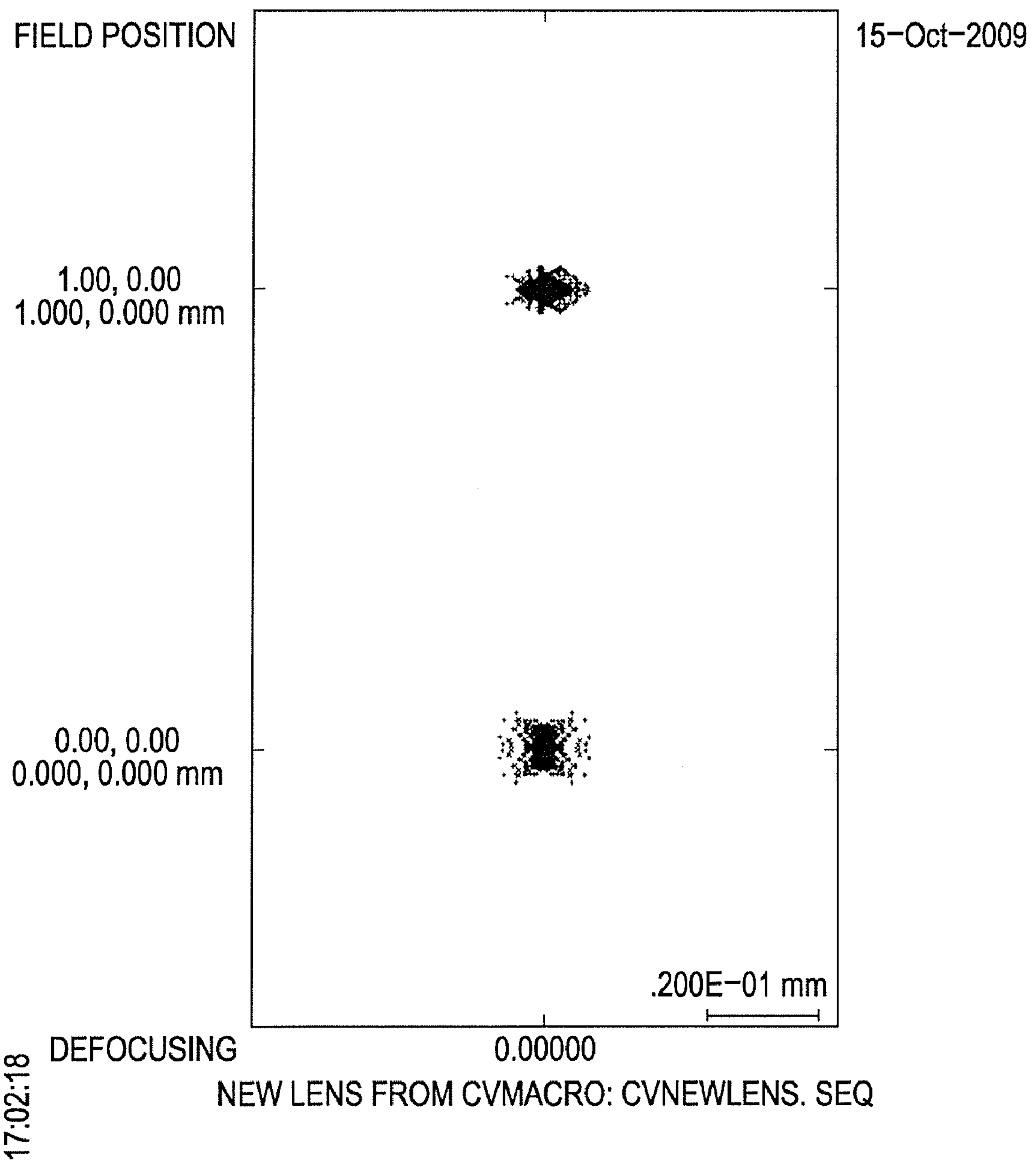
FIG. 12 is a spot diagram when an absolute value of a magnification is 0.85 times.
Figure 13:
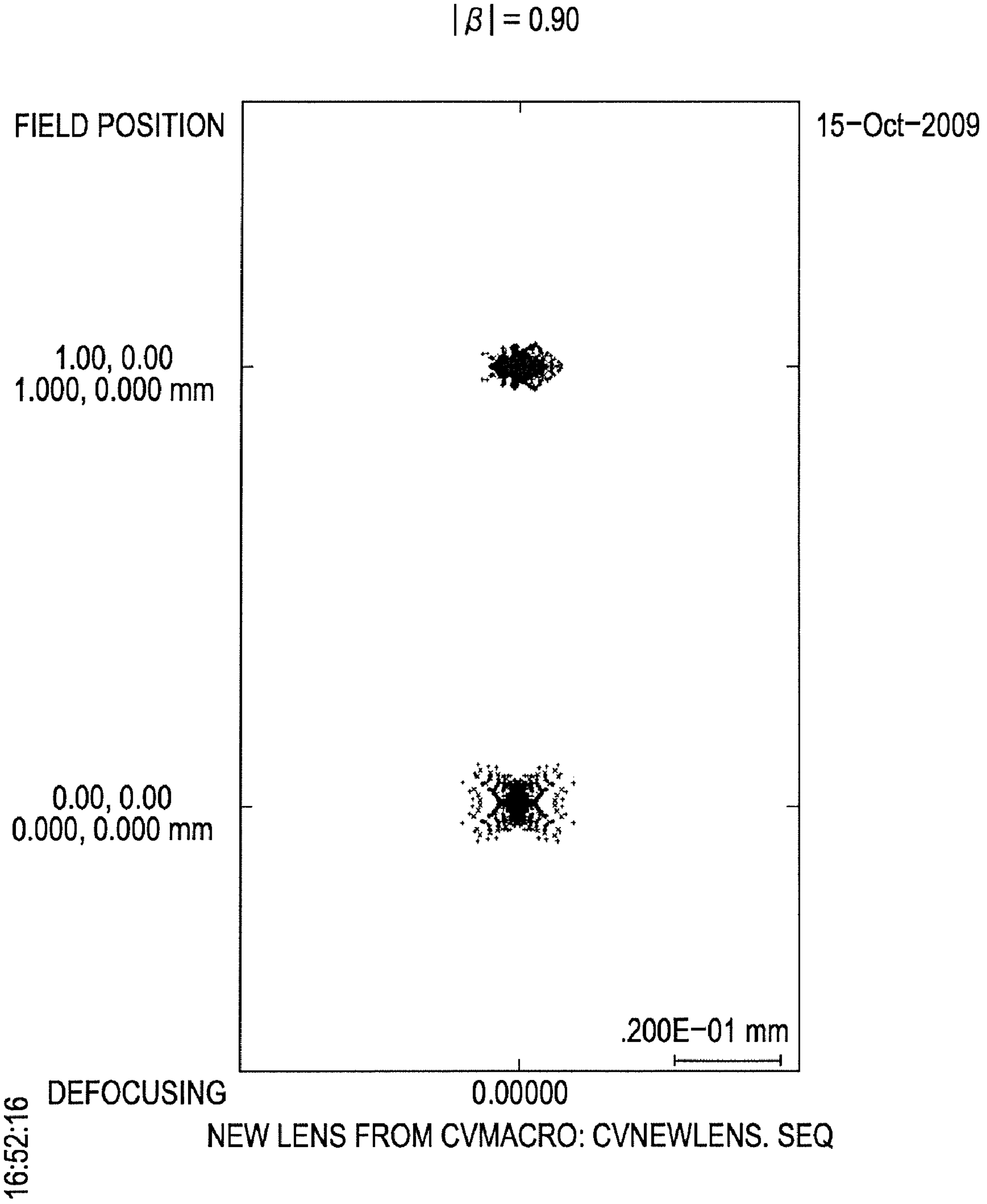
FIG. 13 is a spot diagram when an absolute value of a magnification is 0.90 times.
Figure 14:
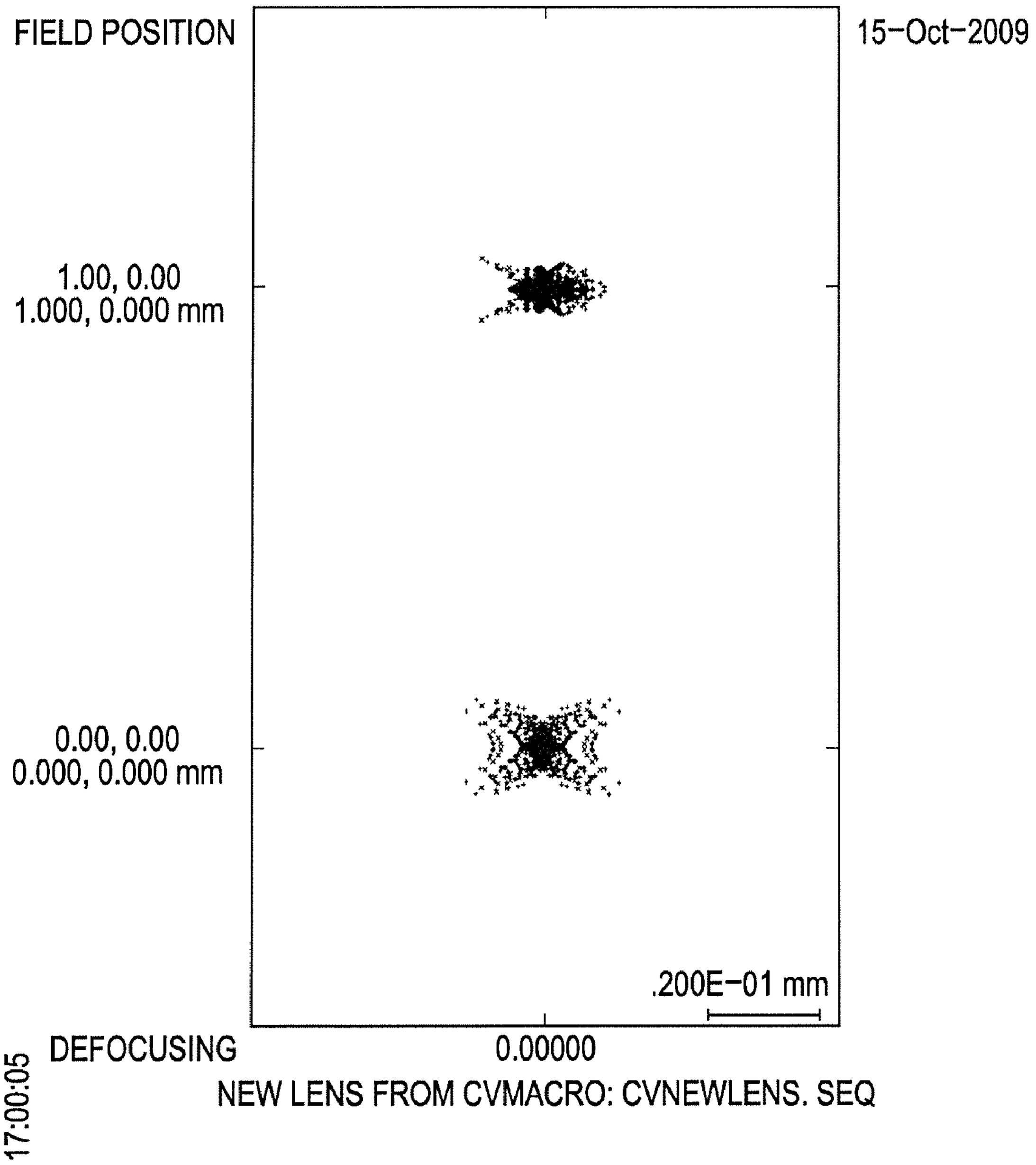
FIG. 14 is a spot diagram when an absolute value of a magnification is 0.95 times.
Figure 15:
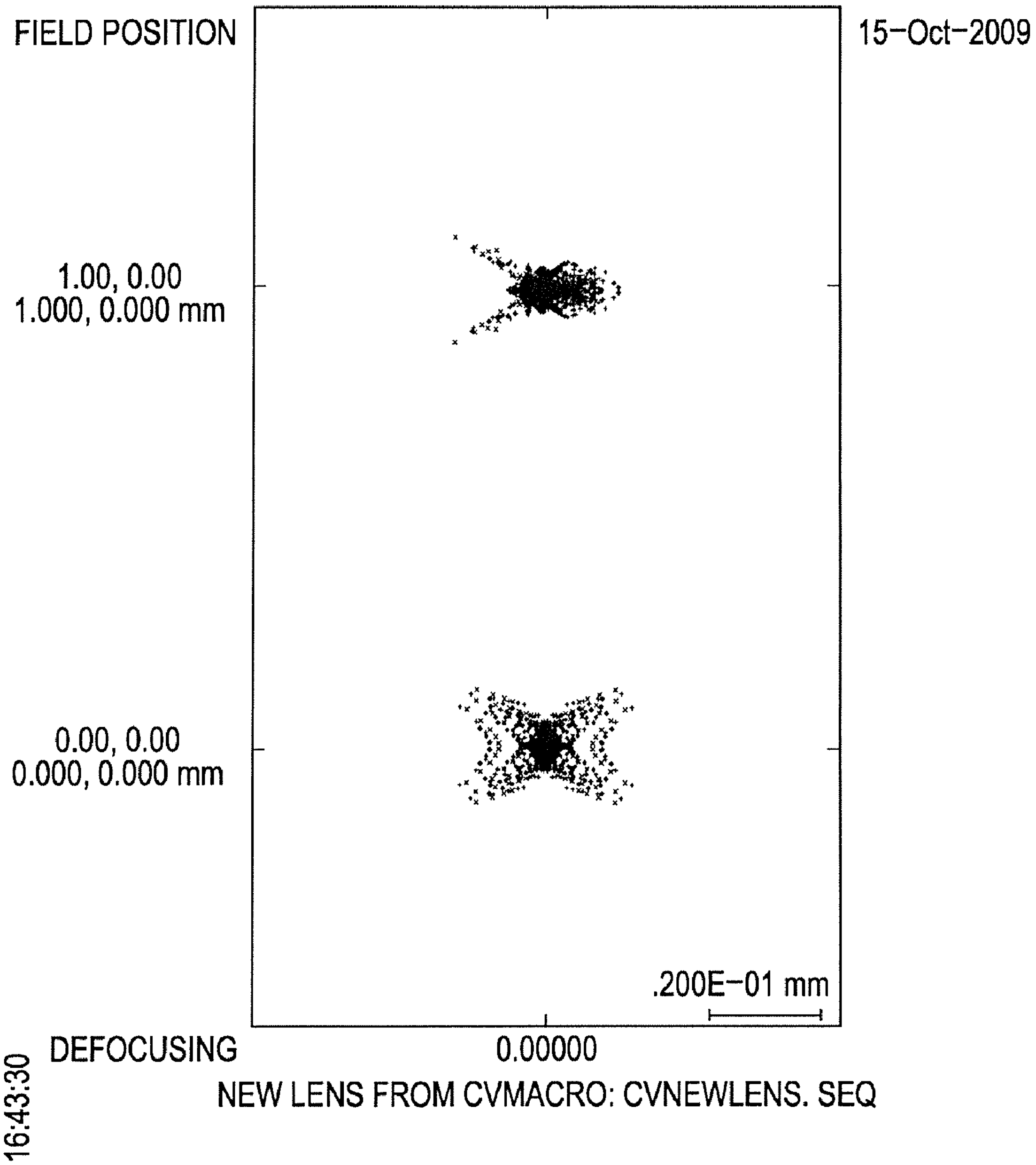
FIG. 15 is a spot diagram when an absolute value of a magnification is 1.00 times.

FIGS. 7 to 15 show results obtained by simulating spot diagrams when the absolute value |β| of the magnification β is changed from 0.60 times to 1.00 times. In more detail, FIG. 7 is a spot diagram showing the case in which |β| is 0.60 times, FIG. 8 is a spot diagram showing the case in which |β| is 0.65 times, FIG. 9 is a spot diagram showing the case in which |β| is 0.70 times, FIG. 10 is a spot diagram showing the case in which |β| is 0.75 times, FIG. 11 is a spot diagram showing the case in which |β| is 0.80 times, FIG. 12 is a spot diagram showing the case in which |β| is 0.85 times, FIG. 13 is a spot diagram showing the case in which |β| is 0.90 times, FIG. 14 is a spot diagram showing the case in which |β| is 0.95 times, and FIG. 15 is a spot diagram showing the case in which |β| is 1.00 times.

Figure 19:
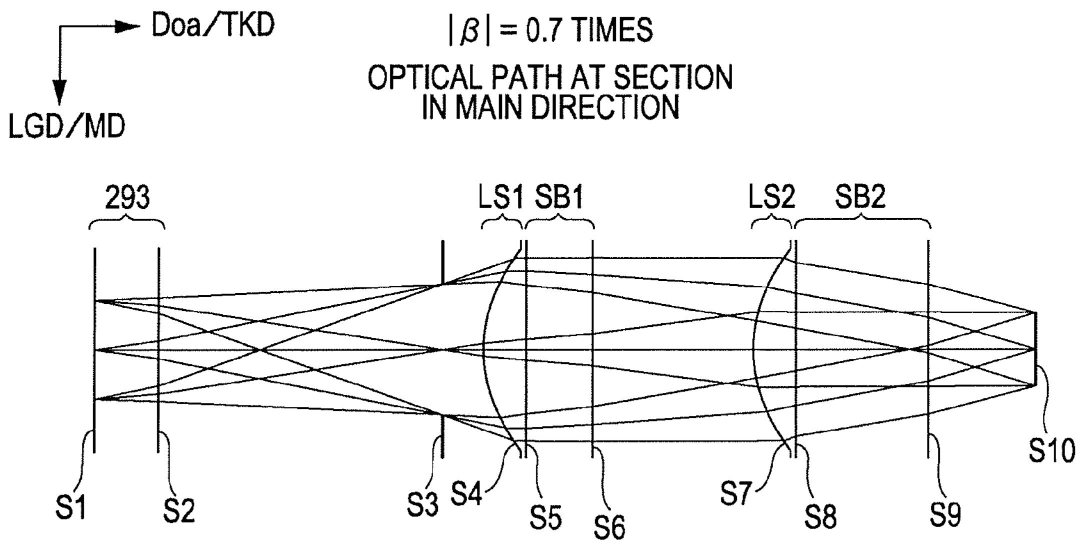
FIG. 19 is a diagram showing an optical path at a section in a main direction of an image forming optical system when an absolute value of a magnification is 0.70 times.
Figure 20:
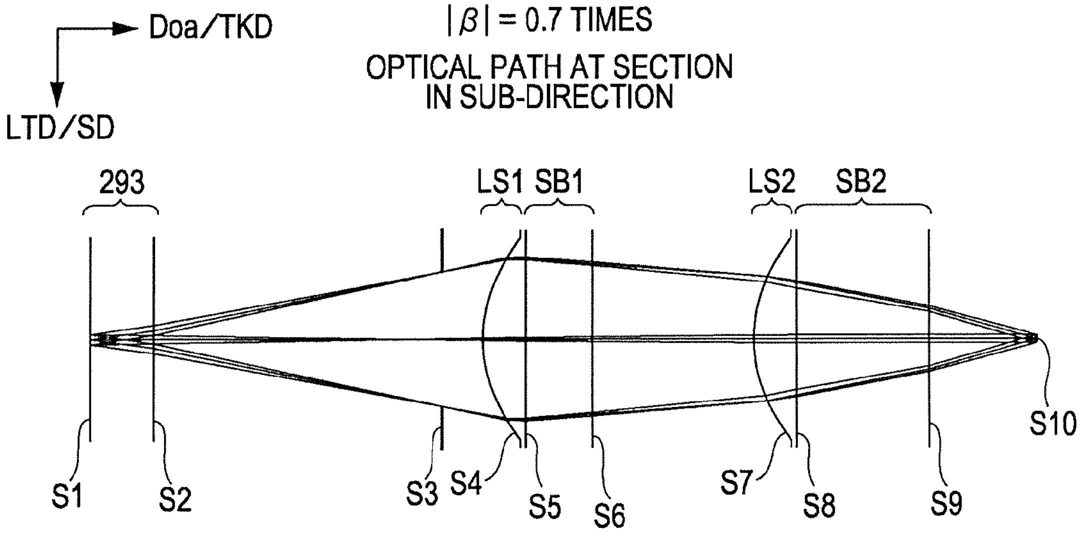
FIG. 20 is a diagram showing an optical path at a section in a sub-direction of an image forming optical system when an absolute value of a magnification is 0.70 times.

Furthermore, FIG. 16 shows lens data of the image forming optical system when |β| is 0.70 times, FIG. 17 shows data when the surface shape of the surface S4 of FIG. 16 is applied, FIG. 18 shows data when the surface shape of the surface S7 of FIG. 16 is applied, FIG. 19 is a diagram showing an optical path at a section in the main direction of the image forming optical system when |β| is 0.70 times, and FIG. 20 is a diagram showing an optical path at a section in the sub-direction of the image forming optical system when |β| is 0.70 times.

Figure 24:
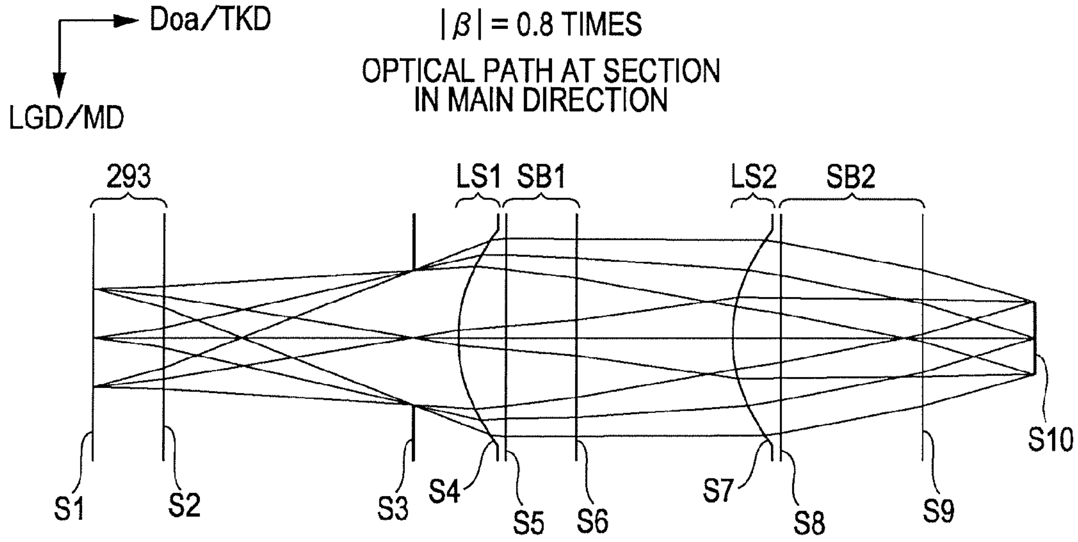
FIG. 24 is a diagram showing an optical path at a section in a main direction of an image forming optical system when an absolute value of a magnification is 0.80 times.
Figure 25:
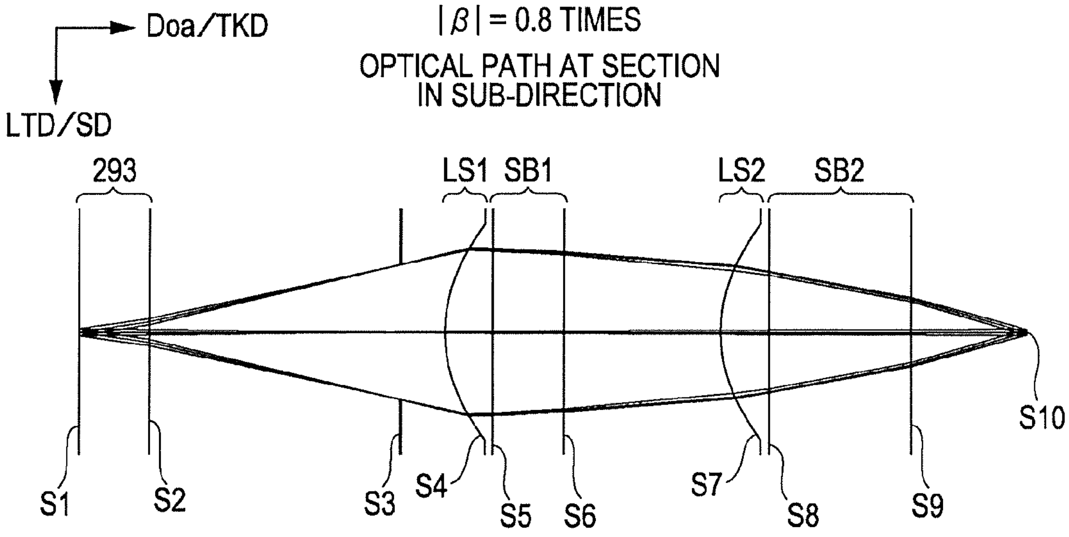
FIG. 25 is a diagram showing an optical path at a section in a sub-direction of an image forming optical system when an absolute value of a magnification is 0.80 times.

In addition, FIG. 21 shows lens data of the image forming optical system when |β| is 0.80 times, FIG. 22 shows data when the surface shape of the surface S4 of FIG. 21 is applied, FIG. 23 shows data when the surface shape of the surface S7 of FIG. 21 is applied, FIG. 24 shows an optical path at a section in the main direction of the image forming optical system when |β| is 0.80 times, and FIG. 25 shows an optical path at a section in the sub-direction of the image forming optical system when |β| is 0.80 times.

As can be understood from FIGS. 16 to 25, the surface S1 is the rear surface (on which the organic EL element is formed) of the glass substrate as the head substrate 293, the surface S2 is the front surface of the glass substrate as the head substrate 293, and the surface S3 is an aperture stop corresponding to the AP of FIG. 3. The surface S4 is the lens surface of the resin lens LS1, the surface S5 is the boundary between the resin lens LS1 and the glass substrate SB1 on which the resin lens LS1 is formed, and the surface S6 is the front surface of the glass substrate SB1. The surface S7 is the lens surface of the resin lens LS2, the surface S8 is the lens surface between the resin lens LS2 and the glass substrate SB2 on which the resin lens LS2 is formed, the surface S9 is the front surface of the glass substrate SB2, and the surface s10 is an image surface (a surface to be exposed). For reference, a SCHOTT BK7 is used as the head substrate 293, and the glass substrates SB1 and SB2.

Figures 26, 27:
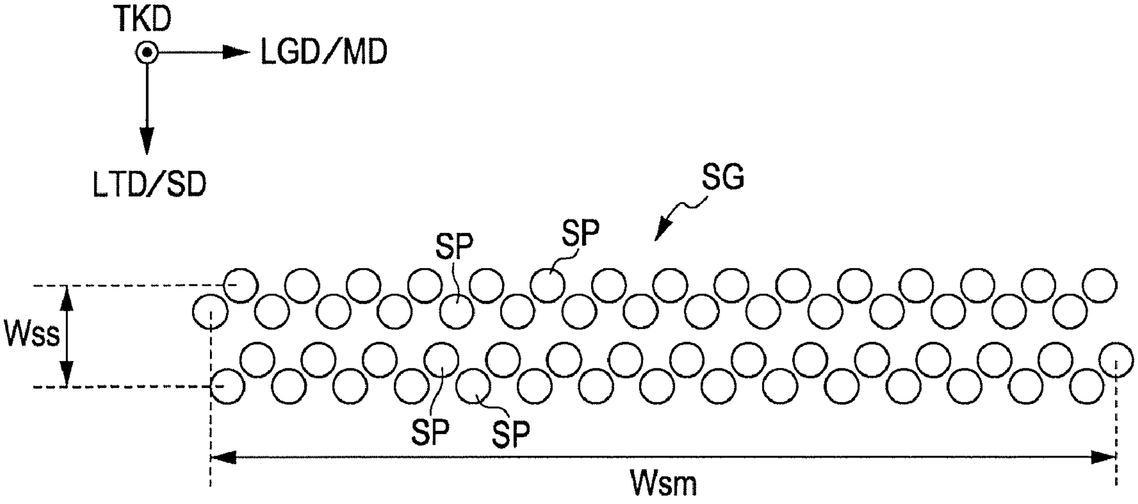
FIG. 26 is a table showing data used for the simulation of an image forming optical system.
FIG. 27 is a diagram explaining data Wsm and Wss of FIG. 26.

Furthermore, FIG. 26 is a table showing data used for the simulation of the image forming optical system, and FIG. 27 is a diagram explaining data Wsm and Wss of FIG. 26. The image forming optical system makes an image by using the light from each light emitting element E other than the dummy elements of the light emitting element group EG, so that a spot group SG including a plurality of spots SP is formed (refer to FIG. 27). Then, the above simulation has been performed to satisfy conditions in which a full width Wsm in the main direction of the spot group of an image side is 0.582 mm, a full width Wss in the sub-direction of the spot group of the image side is 0.063 mm, and numerical aperture of the image side is 0.3038.

As apparent from FIGS. 7 to 15, as the absolute value |β| of the magnification in the main scanning direction MD is increased from 0.85 times, the spot diagram is large, so that an aberration increases. In contrast, when the absolute value |β| of the magnification in the main scanning direction MD is equal to or less than 0.8 times, the spot diagram is small and an aberration is reduced. Thus, in this embodiment, the absolute value |β| of the magnification in the main scanning direction MD is set to be equal to or less than 0.8 times. However, if this value is caused to be very small, since light use efficiency is reduced, it is probable that the amount of lights supplied for the spot formation may not be sufficient. Thus, the lower limit of the absolute value |β| of the magnification in the main scanning direction MD is obtained as follows.

Figure 28:
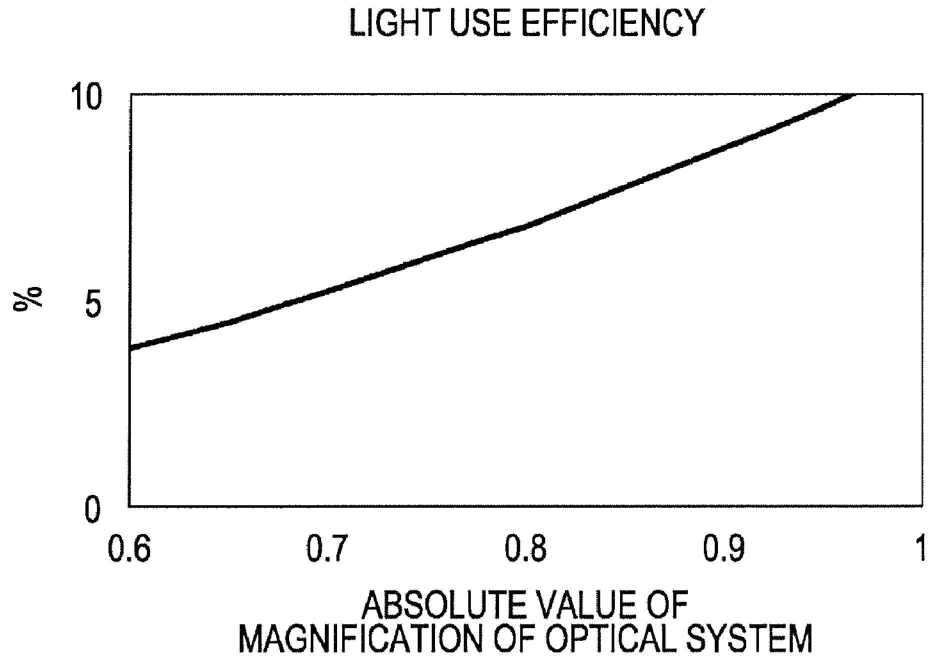
FIG. 28 is a graph showing light use efficiency with respect to an absolute value of a magnification in a main scanning direction.
Figure 29:
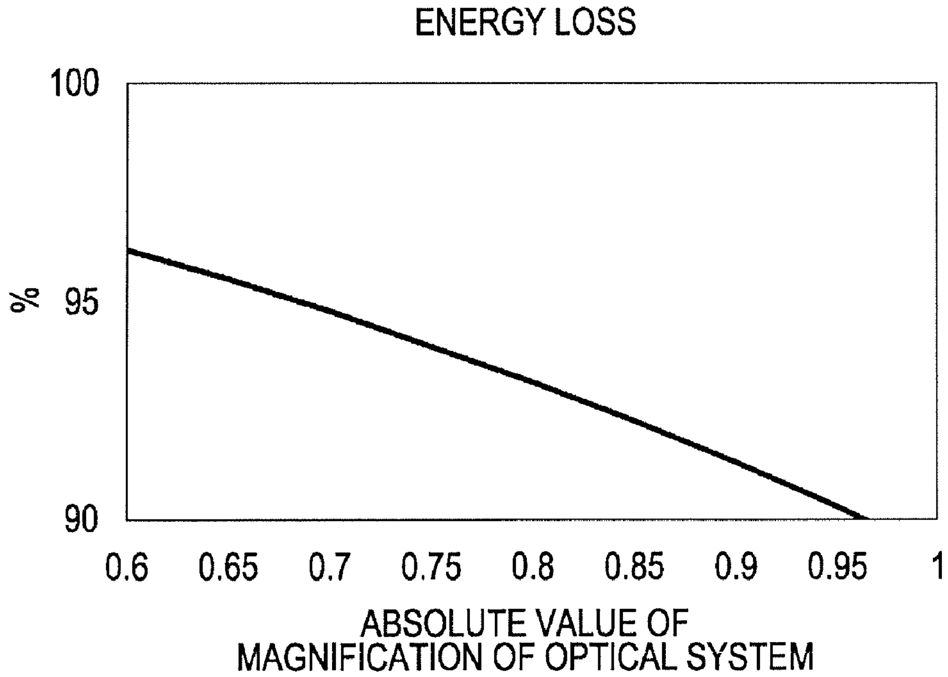
FIG. 29 is a graph showing the energy loss with respect to an absolute value of a magnification in a main scanning direction.

FIG. 28 is a graph showing light use efficiency (a vertical axis) with respect to the absolute value (a horizontal axis) of the magnification in the main scanning direction. Furthermore, energy loss occurring when no light is used is shown in FIG. 29. FIG. 29 is a graph showing the energy loss (a vertical axis) with respect to the absolute value (a horizontal axis) of the magnification in the main scanning direction.

As apparent from FIG. 28, if the absolute value |β| of the magnification in the main scanning direction MD is smaller than 0.70 times, the light use efficiency is less than 5%. In contrast, if the absolute value |β| of the magnification in the main scanning direction MD is equal to or more than 0.70 times, light use efficiency of more than 5% is realized, so that the amount of lights supplied for the spot formation can be sufficient. Furthermore, additionally, the following fact can be understood from FIG. 29. That is, if the absolute value |β| of the magnification in the main scanning direction MD is smaller than 0.70 times, the energy loss exceeds 95% and a part of the loss energy becomes heat, so that heat deterioration of the light emitting element E serving as the organic EL element may be accelerated. In consideration of this fact, in this embodiment, the absolute value |β| of the magnification in the main scanning direction MD is set to be equal to or more than 0.7 times.

As described above, in this embodiment, since the magnification in the main scanning direction of the image forming optical system is equal to or less than 0.8 times, the aberration of the image forming optical system can be reduced. Furthermore, since the magnification in the main scanning direction MD of the image forming optical system is equal to or more than 0.7 times, the light use efficiency can be prevented from being reduced, so that the amount of lights supplied for the spot formation is sufficient. As a result, exposure with high accuracy can be realized. At this time, it is preferable that the absolute value of the magnification in the sub-scanning direction is equal to or more than 0.7 times and equal to or less than 0.8 times.

Furthermore, the image forming optical system includes two lenses LS1 and LS2, thereby facilitating the fabrication of an image forming optical system in which the absolute value of the magnification in the main scanning direction MD is equal to or more than 0.7 times and equal to or less than 0.8 times.

In addition, the image forming optical system including the lenses LS1 and LS2 is preferably an anamorphic optical system. This is because the anamorphic optical system has the advantage of suppressing the aberration of an image forming optical system. Moreover, in this embodiment, since the lenses LS1 and LS2 are resin lenses, an aspheric lens having a complicated shape, in which the curvatures in the main scanning direction MD and the sub-scanning direction SD are different from each other, can be reproduced with high accuracy.

Furthermore, as with the first embodiment, the present invention is preferably applied to the line head 29 in which the organic EL elements as the light emitting elements E are surrounded by the head substrate 293 made of glass and the sealing member 294 made of glass. That is, the organic EL element has characteristics in which heat is generated as light emission is performed, and simultaneously has characteristics in which the life span is reduced due to the deterioration caused by the heat. Consequently, from the standpoint of long life span of the organic EL element, it is preferable to promote heat dissipation from the organic EL element. However, in the configuration in which the organic EL elements are surrounded by the head substrate 293 made of glass and the sealing member 294 made of glass, it is difficult to promote the heat dissipation from the organic EL element. In this regard, in order to suppress the heat generation amount of the organic EL element, it is necessary to control the amount of lights emitted from the organic EL element. Meanwhile, since the image forming optical system of this embodiment has a relatively high light use efficiency with respect to a diffusion light source such as the organic EL element, it is possible to sufficiently ensure the amount of lights supplied for the spot formation while suppressing the light amount from the organic EL element. Consequently, the deterioration of the organic EL element can be suppressed by controlling the light amount from the organic EL element, and exposure with high accuracy can be performed.

Specifically, as with the first embodiment, in the configuration using the bottom emission-type organic EL element array, it is difficult to bring a large light amount of the organic EL element. In this regard, it is preferable to improve the light use efficiency by applying the invention to such a configuration.

Furthermore, as with the first embodiment, in the line head 29 in which the driving circuits DC1 to DC4 for driving the organic EL elements are formed on the head substrate 293, heat from the driving circuits DC1 to DC4 may be transferred to the organic EL elements. In this regard, in order to suppress heat deterioration of the organic EL elements, it is preferable to further control the light amount of the organic EL element. Thus, the degree of light use efficiency is increased by applying the invention to such a configuration, so that the light amount of the organic EL element is suppressed and the amount of lights supplied for the spot formation is ensured to be sufficient, resulting in the realization of exposure with high accuracy.

Second Embodiment

Figure 30:
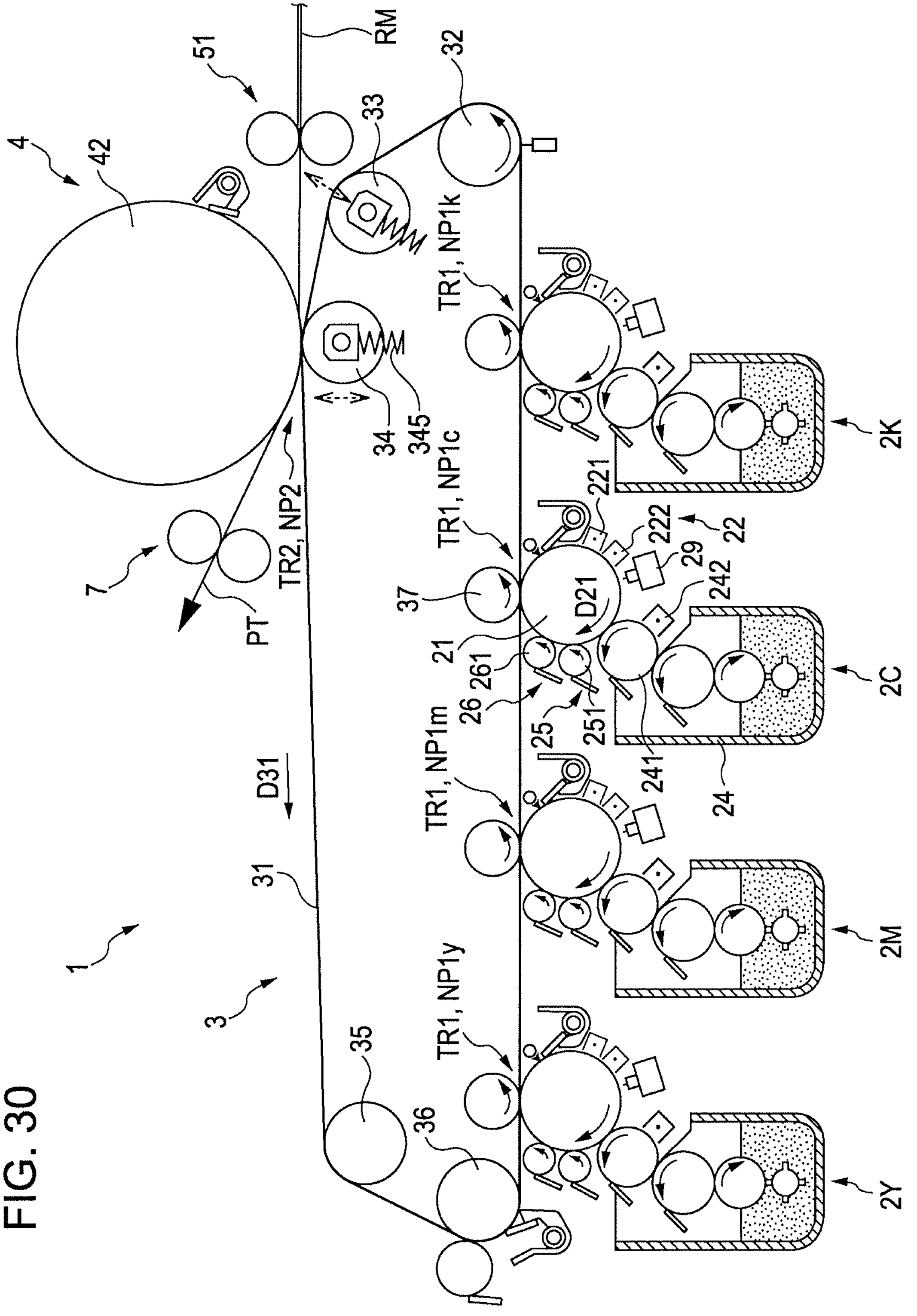
FIG. 30 is a diagram showing one example of an image forming apparatus to which a line head can be applied.
Figure 31:
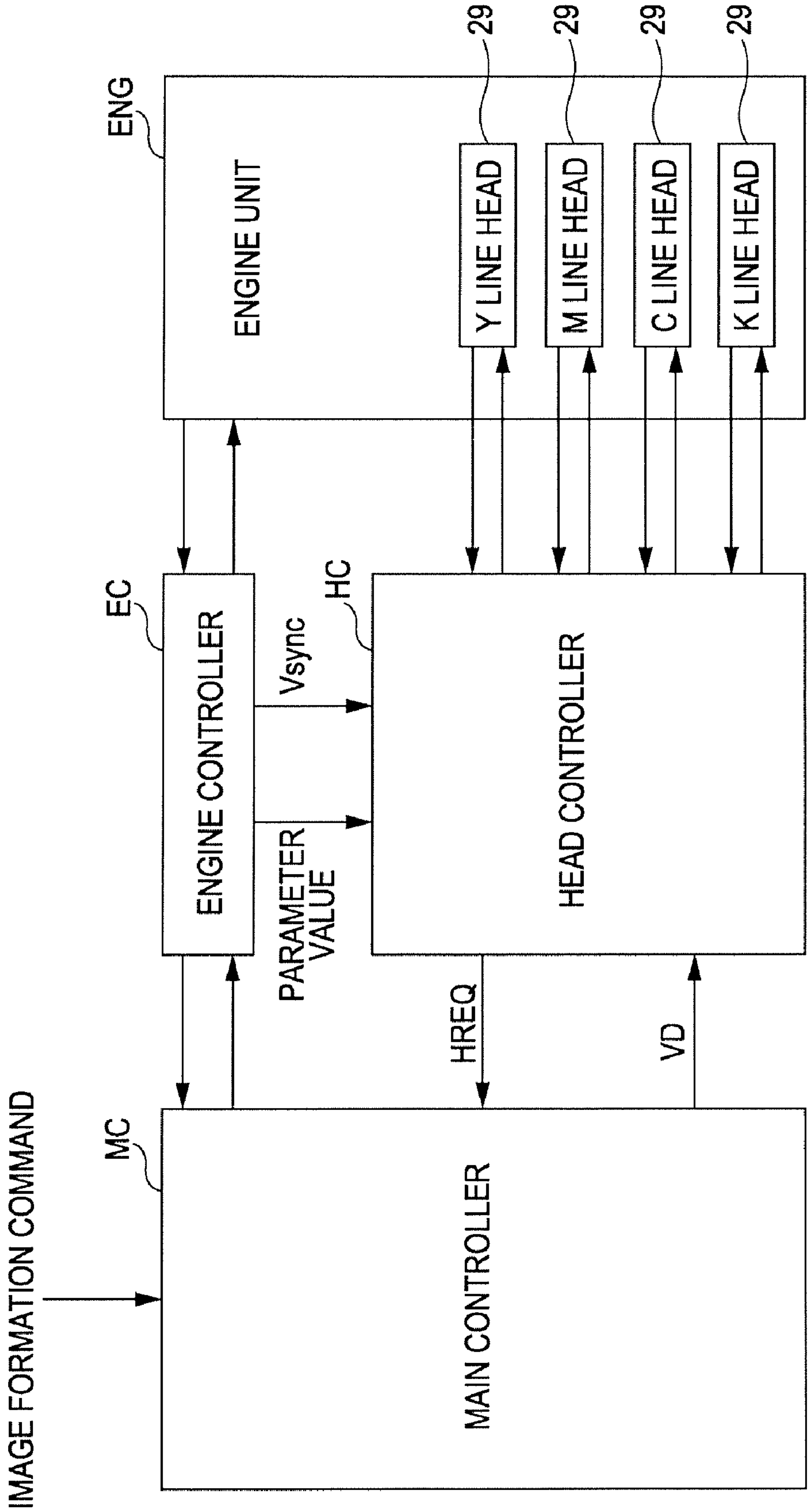
FIG. 31 is a block diagram showing the electrical configuration of the apparatus of FIG. 30.

FIG. 30 is a diagram showing one example of an image forming apparatus to which the above-described line head can be applied. Further, FIG. 31 is a block diagram showing the electrical configuration of the apparatus of FIG. 30. In the second embodiment, one example of the image forming apparatus including the above-described line head 29 will be described with reference to FIGS. 30 and 31. The image forming apparatus 1 includes four image forming stations 2Y (for yellow), 2M (for magenta), 2C (for cyan) and 2K (for black), which form colors different from one another. The image forming apparatus 1 can selectively perform a color mode, in which a color image is formed by superimposing toners of four colors of yellow (Y), magenta (M), cyan (C) and black (K), and a monochrome mode in which a monochrome image is formed using only a toner of black (K).

In the image forming apparatus, if an image forming command is transmitted from an external apparatus such as a host computer to a main controller MC including a CPU, a memory and the like, the main controller MC outputs a control signal to an engine controller EC and outputs video data VD corresponding to the image forming command to a head controller HC. At this time, the main controller MC outputs video data VD corresponding to one line in the main scanning direction MD to the head controller HC whenever receiving a horizontal request signal HREQ from the head controller HC. Furthermore, the head controller HC controls the line heads 29 of the image forming stations 2Y, 2M, 2C and 2K of each color based on the video data VD from the main controller MC and a vertical synchronization signal Vsync and a parameter value from the engine controller EC. In this way, an engine unit ENG performs a predetermined image forming operation, thereby forming an image corresponding to the image forming command on a recording medium RM having a sheet shape such as a copying paper, a transfer paper, a paper and a transparent sheet for OHP.

The image forming stations 2Y, 2M, 2C and 2K have the same structure and function, except for a toner color. In this regard, in FIG. 30, for the simplification of the drawing, reference numerals are added only to each element constituting the image forming station 2C, and reference numerals to be added to the image forming stations 2Y, 2M and 2K will be omitted. Furthermore, in the following description, the structure and operation of the image forming station 2C are described with reference to the reference numerals added to FIG. 30. However, the structure and operation of the image forming stations 2Y, 2M and 2K are the same as those of the image forming station 2C, except for the toner color.

The image forming station 2C is provided with a photoreceptor drum 21 formed on the surface thereof with a toner image of a cyan color. The photoreceptor drum 21 has a rotating shaft which is disposed to be parallel or substantially parallel to the main scanning direction MD (direction perpendicular to the plane of FIG. 30), and rotates at a predetermined speed in the arrow direction D21 of FIG. 30. Thus, the surface of the photoreceptor drum 21 moves in the sub-scanning direction SD perpendicular or substantially perpendicular the main scanning direction MD.

In the vicinity of the photoreceptor drum 21, a charger 22 (a corona charger), the line head 29, a development unit 24, a first squeeze unit 25, a second squeeze unit 26, and a cleaning unit are sequentially disposed along the rotation direction D21 (in FIG. 30, a clockwise direction) of the photoreceptor drum 21. The charger 22 charges the surface of the photoreceptor drum 21 with a predetermined potential. The line head 29 exposes the surface of the photoreceptor drum 21 in response to an image signal to form an electrostatic latent image. The development unit 24 develops the electrostatic latent image into a toner image. The cleaning unit cleans the surface of the photoreceptor drum 21 after being transferred.

In this embodiment, the charger 22 includes two corona chargers 221 and 222, the corona charger 221 is disposed at the upstream side with respect to the corona charger 222 in the rotation direction D21 of the photoreceptor drum 21, and two-stage charging is performed by the two corona chargers 221 and 222. The corona chargers 221 and 222 have the same configuration, do not make contact with the surface of the photoreceptor drum 21, and are scorotron charger.

Then, the line head 29 forms the electrostatic latent image on the surface of the photoreceptor drum 21, which is charged by the corona chargers 221 and 222, based on the video data VD. That is, if the head controller HC transmits the video data VD to the data transmission board TB (refer to FIG. 6) of the line head 29, the data transmission board TB transmits the video data VD to each driver IC 295, and the driver ICs allow each light emitting element E to emit a light based on the video data VD. Thus, the surface of the photoreceptor drum 21 is exposed, resulting in the formation of the electrostatic latent image corresponding to the image signal. In addition, the detailed configuration of the line head 29 has been described above.

By supplying toner from the development unit 24 to the electrostatic latent image formed as mentioned above, the electrostatic latent image is developed by the toner. The development unit 24 of the image forming apparatus 1 includes a development roller 241. The development roller 241 is a member having a cylindrical shape and is obtained by providing an elastic layer such as polyurethane rubber, silicon rubber, NBR or PFA tube at the outer peripheral portion of an inner core made of a metal such as an iron. The development roller 241 is connected to a development motor, rotates counterclockwise in the plane of FIG. 30, and rotates along with the photoreceptor drum 21. Furthermore, the development roller 241 is electrically connected to a development bias generator (a constant voltage source) which is not shown, and receives a development bias at an appropriate timing.

In addition, an anilox roller is provided in order to supply a liquid developer to the development roller 241, and the liquid developer is supplied to the development roller 241 from a developer reservoir through the anilox roller. As described above, the anilox roller has a function of supplying the liquid developer to the development roller 241. A concave pattern formed by a fine and uniformly engraved spiral groove and the like is formed on the surface of the anilox roller such that the liquid developer is easily carried. Similarly to the development roller 241, the anilox roller uses a roller obtained by wrapping a rubber layer such as urethane and NBR around a metal cored bar or coating a PFA tube on the metal cored bar, and the like. Furthermore, the anilox roller is connected to the development motor and rotates together with the development motor.

The liquid developer stored in the developer reservoir uses a high concentration liquid developer having a high viscosity with about 20% of toner solid content concentration (about 30 mPa·s to about 10,000 mPa·s) which is obtained by adding a solid having an average particle size of 1 μm to a liquid solvent such as an organic solvent, silicon oil, mineral oil or edible oil and fat together with a dispersant, instead of a generally used volatile liquid developer having a low concentration of 1 wt % to 2 wt % and a low viscosity, a volatility at room temperature and using Isopar (trademark: exon) as a liquid carrier, wherein the solid is obtained by dispersing a coloring agent such as a pigment into non-volatile resin at room temperature.

In this way, the development roller 241, to which the liquid developer is supplied, simultaneously rotates with the anilox roller, and rotates to move in the same direction together with the surface of the photoreceptor drum 21, thereby transporting the liquid developer carried on the surface of the development roller 241 to a development position. In addition, in order to form the toner image, the development roller 241 needs to rotate along with the photoreceptor drum 21 such that the surface of the development roller 241 moves in the same direction together with the surface of the photoreceptor drum 21. However, with respect to the anilox roller, the development roller 241 may move in the reverse direction or the same direction.

Furthermore, in the development unit 24, a toner compression corona generator 242 is disposed to face the development roller 241 just before the upstream side of the development position in the rotation direction of the development roller 241. The toner compression corona generator 242 is an electric field applying unit for increasing a charging bias of the surface of the development roller 241, and is electrically connected to a toner charge generator (not shown) including a constant current source. If a toner charge bias is applied to the toner compression corona generator 242, an electric field is applied to the toner of the liquid developer transported by the development roller 241 at the position adjacent to the toner compression corona generator 242, so that charging and compression are performed. In addition, for the toner charging and compression, a compaction roller for contacting and charging the toner may also be used, instead of corona discharge due to the application of an electric field.

Furthermore, the development unit 24 configured mentioned above reciprocates between the development position, at which the latent image on the photoreceptor drum 21 is developed, and a withdrawn position spaced apart from the photoreceptor drum 21. Thus, if the development unit 24 moves to the withdrawn position and is positioned, the supply of a new liquid developer to the photoreceptor drum 21 is stopped in the image forming station 2C for cyan during that time.

The first squeeze unit 25 is disposed at the downstream side of the development position in the rotation direction D21 of the photoreceptor drum 21, and the second squeeze unit 26 is further disposed at the downstream side of the first squeeze unit 25. Squeeze rollers 251 and 261 are provided for the squeeze units 25 and 26, respectively. The squeeze roller 251 rotates by receiving rotation driving force from the main motor while making contact with the surface of the photoreceptor drum 21 at a first squeeze position, thereby removing a surplus developer of the toner image. Furthermore, the squeeze roller 261 rotates by receiving rotation driving force from the main motor while making contact with the surface of the photoreceptor drum 21 at a second squeeze position of the downstream side of the first squeeze position in the rotation direction D21 of the photoreceptor drum 21, thereby removing a surplus liquid carrier of the toner image and fogging toner. Furthermore, in this embodiment, in order to improve the squeeze efficiency, a squeeze bias generator (a constant voltage source), which is not shown, is electrically connected to the squeeze rollers 251 and 261, and a squeeze bias is applied to the squeeze rollers 251 and 261 at an appropriate timing. In addition, in this embodiment, the two squeeze units 25 and 26 are provided. However, the number and arrangement of the squeeze units are not limited thereto. For example, one squeeze unit may be disposed.

The toner image having passed through these squeeze positions is primarily transferred on an intermediate transfer member 31 of a transfer unit 3. The intermediate transfer member 31 is an endless belt as an image carrying member capable of temporarily carrying the toner image on the surface thereof, in more detail, the outer peripheral surface thereof, and is stretched on a plurality of rollers 32 to 36. Among them, the roller 32 is connected to the main motor and serves as a belt driving roller that allows the intermediate transfer member 31 to circumferentially move in the arrow direction D31 of FIG. 30. In addition, in this embodiment, in order to enhance transfer property of the toner image to a recording paper RM by increasing an adherence property with respect to the recording paper RM, an elastic layer is provided for the surface of the intermediate transfer member 31 and the toner image is carried on the surface of the elastic layer.

Herein, among the rollers 32 to 36 stretching the intermediate transfer member 31, only the belt driving roller 32 is driven by the main motor, and the other rollers 33 to 36 are driven rollers having no driving source. Furthermore, the belt driving roller 32 is wound with the intermediate transfer member 31 at the downstream side of primary transfer positions TR1 and at the upstream side of a secondary transfer position TR2, which will be described later, in the belt movement direction D31.

The transfer unit 3 includes a primary transfer backup roller 37. The primary transfer backup roller 37 is disposed to face the photoreceptor drum 21 while interposing the intermediate transfer member 31 therebetween. At the primary transfer position TR1 at which the photoreceptor drum 21 makes contact with the intermediate transfer member 31, the outer peripheral surface of the photoreceptor drum 21 makes contact with the intermediate transfer member 31 to form a primary transfer nip portion NP1*c*. Then, the toner image on the photoreceptor drum 21 is transferred to the outer peripheral surface (the lower surface at the primary transfer position TR1) of the intermediate transfer member 31. In this way, the toner image of the cyan color, which is formed by the image forming station 2C, is transferred to the intermediate transfer member 31. In the same manner, transfer of toner images is also performed in the other image forming stations 2Y, 2M and 2K, so that the toner images of each color are sequentially superimposed on the intermediate transfer member 31, thereby forming a full color toner image. Meanwhile, when the monochrome toner image is formed, a toner image is transferred to the intermediate transfer member 31 only in the image forming station 2K corresponding to a black color.

The toner image transferred to the intermediate transfer member 31 in this way is transported to the secondary transfer position TR2 via the winding position of the belt driving roller 32. At the secondary transfer position TR2, a secondary transfer roller 42 of a secondary transfer unit 4 is disposed to face a roller 34, which is wound with the intermediate transfer member 31, while interposing the intermediate transfer member 31 therebetween, and the surface of the intermediate transfer member 31 makes contact with the surface of the secondary transfer roller 42 to form a secondary transfer nip portion NP2. That is, the roller 34 serves as a secondary transfer backup roller. The rotating shaft of the backup roller 34 is elastically supported by a pressing section 345 serving as an elastic member such as a spring and is supported so as to be movable toward and away from the intermediate transfer member 31.

At the secondary transfer position TR2, the toner image of a single color or plural colors, which is formed on the intermediate transfer member 31, is transferred to the recording medium RM transported from a pair of gate rollers 51 along a transport path PT. Furthermore, the recording medium RM on which the toner image is secondarily transferred is sent from the secondary transfer roller 42 to fixing units 7 provided on the transport path PT. In the fixing units 7, heat, pressure and the like are applied to the toner image transferred on the recording medium RM, so that the toner image is fixed to the recording medium RM. In this way, a desired image is formed on the recording medium RM.

Others

As described above, in the previous embodiments, the line head 29 corresponds to the "exposure head" of the invention, and the photoreceptor drum 21 corresponds to the "latent image carrier" of the invention. Furthermore, the light emitting element E corresponds to the "light emitting element" of the invention, and the lenses LS1 and LS2 constitute the "image forming optical system" of the invention. In addition, the lens LS1 corresponds to the "first lens" of the invention, and the lens LS2 corresponds to the "second lens" of the invention. Moreover, the head substrate 293 corresponds to the "head substrate" of the invention, the sealing member 294 corresponds to the "sealing member" of the invention, and the driving circuits DC1 to DC4 correspond to the "driving circuit" of the invention. Furthermore, the main scanning direction MD corresponds to the "first direction" of the invention.

In addition, the invention is not limited to the previous embodiments, and numerous other modified examples can be devised by those skilled in the art that will fall within the spirit and scope of the present invention. That is, for example, in the previous embodiments, the bottom emission type organic EL element is used as the light emitting element E. However, a top emission type organic EL element may also be used as the light emitting element E, or a light emitting diode (LED) and the like in addition to the organic EL element may also be used as the light emitting element E.

Furthermore, the number of the lens arrays and the configurations (the arrangement configuration, formation position and the like of a lens) of the lens arrays LA1 and LA2 can be appropriately changed. In the previous embodiments, both the lenses LS1 and LS2 are configured by an aspheric lens. However, also, for example, only one of the lenses LS1 and LS2 may be configured by an aspheric lens, or both of them may be configured by a spheric lens.

In addition, the number of the light emitting elements E constituting the light emitting element group EG and the arrangement configuration of each light emitting element E may also be appropriately changed.

The entire disclosure of Japanese Patent Applications No. 2009-269833, filed on Nov. 27, 2009 is expressly incorporated by reference herein.

What is claimed is:

1. An exposure head comprising:

a light emitting element array including light emitting elements disposed in a first direction;

a light blocking member including an aperture stop through which lights emitted from the light emitting elements pass; and an image forming optical system that makes an image by using the lights having passed through the light blocking member, wherein an absolute value of a magnification in the first direction of the image forming optical system is equal to or more than 0.7 times and is equal to or less than 0.8 times.

2. The exposure head according to claim 1, wherein the image forming optical system includes a first lens and a second lens, and the lights emitted from the light emitting elements are imaged after being transmitting through the first lens and then the second lens.

3. The exposure head according to claim 1, wherein the image forming optical system is an anamorphic optical system.

4. The exposure head according to claim 2, wherein the first lens and the second lens is a resin lens.

5. The exposure head according to claim 1, wherein the light emitting elements are organic EL elements, and the light emitting element array includes a head substrate made of glass, on which the organic EL elements are disposed, and a sealing member that seals the organic EL elements.

6. The exposure head according to claim 5, wherein the light emitting element array is a bottom emission type organic EL element array.

7. The exposure head according to claim 5, further comprising a driving circuit disposed on the head substrate to drive the organic EL element.

8. An image forming apparatus comprising:

a latent image carrier on which a latent image is formed;

an exposure head; and a development unit that develops the latent image formed on the latent image carrier by the exposure head, wherein the exposure head includes:

a light emitting element array including light emitting elements disposed in a first direction;

a light blocking member including an aperture stop through which lights emitted from the light emitting elements pass; and an image forming optical system that allows the lights having passed through the light blocking member to transmit therethrough so that the latent image carrier is exposed, wherein an absolute value of a magnification in the first direction of the image forming optical system is equal to or more than 0.7 times and is equal to or less than 0.8 times.

* * * * *